(12) United States Patent
Slakey et al.

(10) Patent No.: US 11,295,276 B1
(45) Date of Patent: Apr. 5, 2022

(54) SYSTEM AND METHOD FOR MANAGING MAINTENANCE ITEMS WITHIN A TRANSPORTATION SYSTEM

(71) Applicant: AMERICAN AIRLINES, INC., Fort Worth, TX (US)

(72) Inventors: Roger Louis Slakey, St. Peters, MO (US); Pengcheng Zhang, Colleyville, TX (US); Noonu Joseph Alummoottil, Irving, TX (US); Linda Norfleet, Claremore, OK (US); Jerilynn Daykin, Collinsville, OK (US); Tim Towns, Claremore, OK (US); Mei Zhang, Lewisville, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 0 days.

(21) Appl. No.: 16/296,835

(22) Filed: Mar. 8, 2019

Related U.S. Application Data

(63) Continuation of application No. 13/932,447, filed on Jul. 1, 2013, now abandoned.

(51) Int. Cl.
*G06Q 10/00* (2012.01)
(52) U.S. Cl.
CPC .................... *G06Q 10/20* (2013.01)
(58) Field of Classification Search
None
See application file for complete search history.

(56) References Cited

U.S. PATENT DOCUMENTS

| | | | |
|---|---|---|---|
| 5,974,349 A | 10/1999 | Levine | |
| 6,003,808 A | 12/1999 | Nguyen et al. | |
| 6,418,361 B2 | 7/2002 | Sinex | |
| 6,453,823 B1 * | 9/2002 | Barich | B61B 1/00 104/307 |
| 6,519,763 B1 * | 2/2003 | Kaufer | G06Q 10/109 706/21 |
| 6,769,162 B1 * | 8/2004 | Barich | B61J 1/10 104/26.1 |
| 6,901,318 B1 * | 5/2005 | Morronigiello | G06Q 10/06 701/29.4 |
| 7,937,280 B1 * | 5/2011 | Leung | G06Q 10/025 705/6 |
| 8,255,097 B1 | 8/2012 | Wander | |

(Continued)

OTHER PUBLICATIONS

Ackert (Basics of Aircraft Maintenance Reserve Deployment and Management, A Lessor's Perspective of Maintenance Reserve Theory and Best Practices, Shannon Ackert, Aug. 2012).*

(Continued)

*Primary Examiner* — Matthew D Henry
(74) *Attorney, Agent, or Firm* — Haynes and Boone, LLP

(57) ABSTRACT

A system and method for managing maintenance items within a transportation system according to which a workload assignment is generated. The transportation system includes an aircraft fleet and the method includes presenting a window on a graphical user interface and receiving a request to complete a maintenance item via the window. The window includes a number of selection boxes, drop-down menus, and text boxes configured to receive the request to complete the maintenance item.

7 Claims, 17 Drawing Sheets

(56) References Cited

U.S. PATENT DOCUMENTS

| | | | |
|---|---|---|---|
| 8,849,690 B1* | 9/2014 | Yang | G06Q 10/063116 |
| | | | 705/7.22 |
| 2002/0065749 A1 | 5/2002 | Ikeda et al. | |
| 2002/0133389 A1* | 9/2002 | Sinex | G06Q 40/08 |
| | | | 702/29 |
| 2002/0143601 A1 | 10/2002 | Sinex | |
| 2003/0167110 A1* | 9/2003 | Smith | G08G 5/0043 |
| | | | 701/3 |
| 2004/0122722 A1 | 6/2004 | Quintus et al. | |
| 2004/0122723 A1 | 6/2004 | Quintus et al. | |
| 2004/0138938 A1 | 7/2004 | Quintus et al. | |
| 2005/0187739 A1 | 8/2005 | Baust et al. | |
| 2005/0198803 A1* | 9/2005 | Moriya | B62D 65/18 |
| | | | 29/430 |
| 2005/0246224 A1 | 11/2005 | McKanna et al. | |
| 2006/0089486 A1 | 4/2006 | Middlebrook | |
| 2006/0230975 A1* | 10/2006 | Shiwaku | B61B 1/00 |
| | | | 104/88.01 |
| 2006/0294140 A1 | 12/2006 | Schemionek et al. | |
| 2007/0112488 A1* | 5/2007 | Avery | G06Q 10/087 |
| | | | 701/29.3 |
| 2007/0112489 A1 | 5/2007 | Avery et al. | |
| 2007/0156496 A1 | 7/2007 | Avery et al. | |
| 2008/0159158 A1 | 7/2008 | Poisson et al. | |
| 2009/0125357 A1 | 5/2009 | Vannette et al. | |
| 2009/0138873 A1 | 5/2009 | Beck et al. | |
| 2009/0150022 A1* | 6/2009 | McMillin | G06Q 10/20 |
| | | | 701/33.4 |
| 2009/0254403 A1* | 10/2009 | Nagalla | G06Q 10/06 |
| | | | 705/7.38 |
| 2010/0100271 A1* | 4/2010 | Nagalla | G06Q 10/06 |
| | | | 701/31.4 |
| 2011/0196908 A1* | 8/2011 | Sukthankar | G06N 3/126 |
| | | | 709/201 |
| 2014/0281712 A1* | 9/2014 | Subbu | G06Q 10/06311 |
| | | | 714/25 |

OTHER PUBLICATIONS

Steiner et al. (A Heuristic Method for Aircraft Maintenance Scheduling under Various Constraints, Albert Steiner, Zurich University, Conference Paper STRC 2006, Mar. 15-17, 2006, pp. 1-28).*
Non-Final Office Action dated Apr. 2, 2015 regarding U.S. Appl. No. 13/932,447, 37 pages.
Final Office Action dated Aug. 18, 2015 regarding U.S. Appl. No. 13/932,447, 27 pages.
Advisory Action dated Oct. 19, 2015 regarding U.S. Appl. No. 13/932,447, 3 pages.
Non-Final Office Action dated Feb. 19, 2016 regarding U.S. Appl. No. 13/932,447, 28 pages.
Final Office Action dated Jun. 28, 2016 regarding U.S. Appl. No. 13/932,447, 30 pages.
Advisory Action dated Sep. 6, 2016 regarding U.S. Appl. No. 13/932,447, 3 pages.
Non-Final Office Action dated Jan. 6, 2017 regarding U.S. Appl. No. 13/932,447, 28 pages.
Final Office Action dated May 17, 2017 regarding U.S. Appl. No. 13/932,447, 50 pages.
Advisory Action dated Jul. 25, 2017 regarding U.S. Appl. No. 13/932,447, 3 pages.
Non-Final Office Action dated Nov. 9, 2017 regarding U.S. Appl. No. 13/932,447, 34 pages.
Final Office Action dated Apr. 11, 2018 regarding U.S. Appl. No. 13/932,447, 25 pages.
Advisory Action dated Jun. 20, 2018 regarding U.S. Appl. No. 13/932,447, 3 pages.

* cited by examiner

TMOD FMR DETAILS

FMR Name : 55453F555    FMR Type : SPL    MEL Type :

[PREVIOUS]    [Display Kit]    [NEXT]

Last Reviewed on :    Last Reviewed By :

TMOD Comments:

Flight Allowance (Select Only 1)

| Select ▼ |
|---|
| Select |
| Hot fix |
| Must fix tonight |
| Must fix within 3 days |
| Must fix within 5 days |
| Must fix within 10 days |
| Must fix within 20 days |
| Must fix within 30 days |
| Due By... |

Date Due
TST Due
Cycles Due

Location
☑ One or more stations    MIA, LAX, AFW
(Comma Delimited)
☐ Class I Station
☐ Class II Station Touch Time Evaluation
(Complete min two Areas)
Est. General manhrs to repair  2.0
Est. Avionics manhrs to repair  0.0
RQRD Est. touch time to repair  2.0

Miscellaneous Tags (At Least One Selection Required)
No tags required ☐
Tech Manager Policy item ☐
Overwater restriction ☐
No south of 5 degrees north ☐
ETOPS limit:
   ○ N/A   ○ 120 min   ○ 180 min
Wide body domestic restriction ☐
Wx-related item ☐
Auto Assign ☐
Fuel Related Item ☐

Not Assignable Before
⦿ To Go
   Days
   Hours
   Cycles
○ Time at Assign
   Days
   Hours
   Cycles

[Validate]    [Close]    [Complete]
[Delete]              [Reject]

TMOD FMR DETAILS

FMR Name : 55453F555    FMR Type : SPL    MEL Type :

[PREVIOUS]    [Hide K**]    [NEXT]

```
SPL              SYS 5310             AC 554 AA
        G/M 01.0 A/M 00.0 G/TIME 01.0
MDIS.21 MAY/TUL            EMPL 127505
    DENT IN FUSELAGE CROWN SKIN MPN 5911422-69 AS A
    RESULT OF HAIL. INTERIM REPAIR ACCOMPLISHED PER EA
    MD80-53-023711 DATED 14MAY2012.
    TST 61387 CYC 31609.

ATBT.21MAY/TUL    NAME T. J. GRANQUIST    EMPL 127505
1      ACCOMPLISH EXTERNAL DVI AT 12 MONTH INTERVALS.

55453F555/1237.21MAY.TUL...DFRD - 85 DAYS
```

Fig. 7

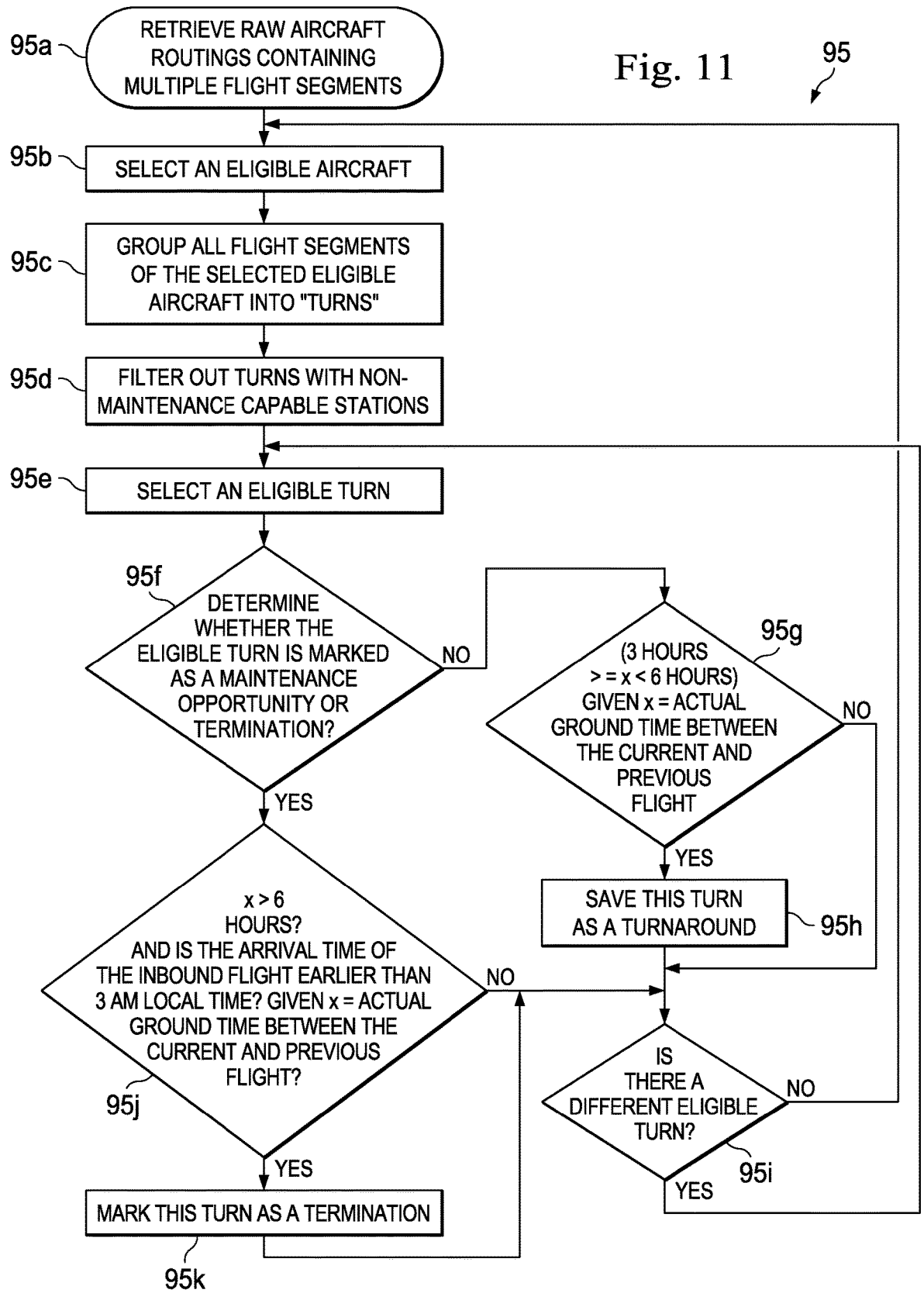

SYSTEM AND METHOD FOR MANAGING MAINTENANCE ITEMS WITHIN A TRANSPORTATION SYSTEM

CROSS-REFERENCE TO RELATED APPLICATION

This application is a continuation of U.S. application Ser. No. 13/932,447, filed Jul. 1, 2013, the entire disclosure of which is hereby incorporated herein by reference.

BACKGROUND

The present disclosure relates in general to a system and method for managing maintenance items within a transportation system such as, for example, air, land or sea transportation systems, and in particular to a system and method for managing and assigning maintenance items based on the type of maintenance item, the routing schedule associated with vehicles within the transportation system, and manpower available to complete the maintenance items.

BRIEF DESCRIPTION OF THE DRAWINGS

FIG. 6 is another diagrammatic illustration of the remote user device of FIG. 2, according to an exemplary embodiment.

FIG. 7 is another diagrammatic illustration of the remote user device of FIG. 2, according to an exemplary embodiment.

FIG. 11 is a flow chart illustration of a step of the method of FIG. 3, according to another exemplary embodiment.

DETAILED DESCRIPTION

Figure 1:
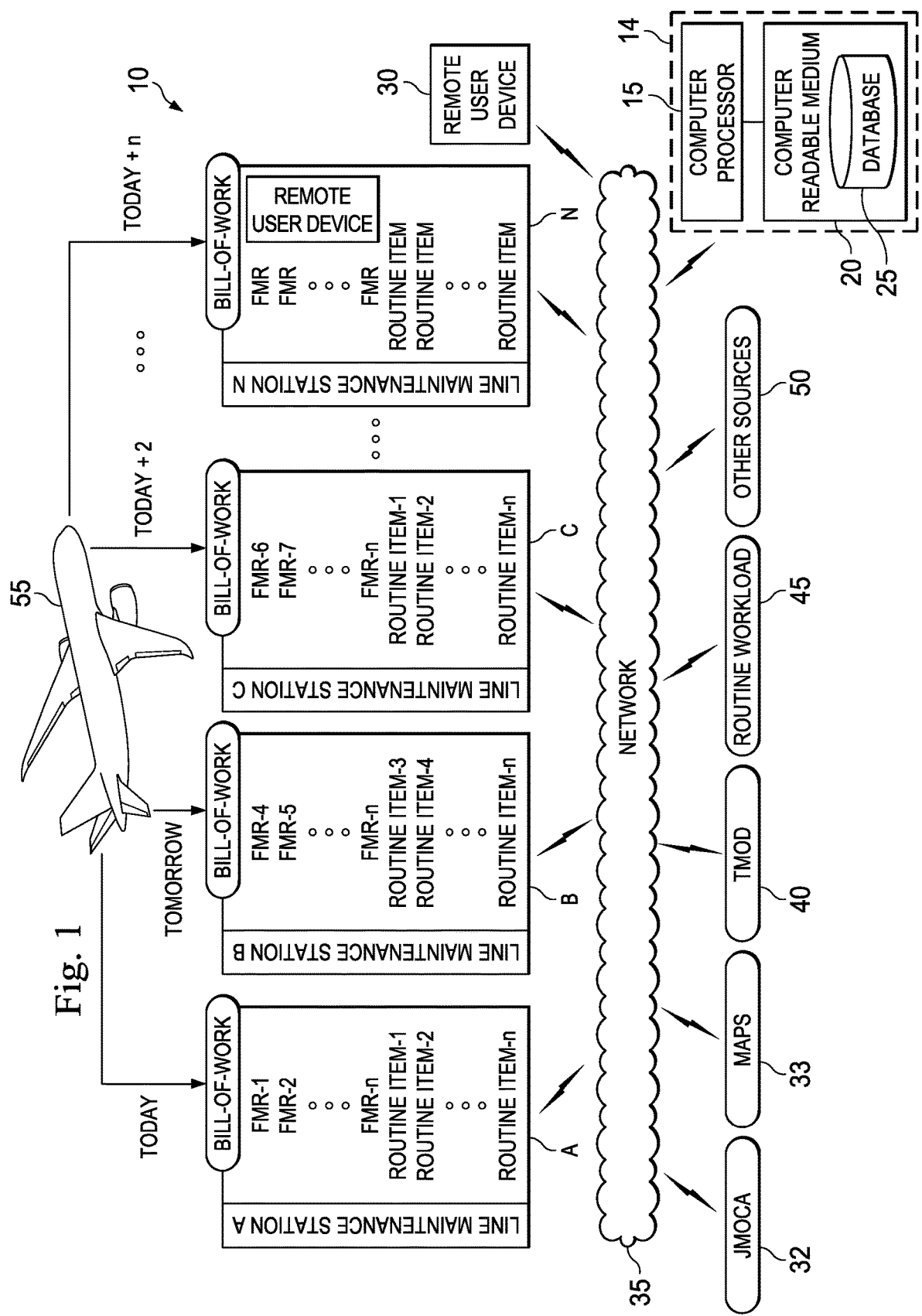
FIG. 1 is a diagrammatic illustration of a system according to an exemplary embodiment, the system including a remote user device.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In an exemplary embodiment, as illustrated in FIG. 1, a system is generally referred to by the reference numeral 10 and includes a functional module 14, which includes a computer processor 15 and a computer readable medium 20 operably coupled thereto. Instructions accessible to, and executable by, the computer processor 15 are stored on the computer readable medium 20. A database 25 is also stored in the computer readable medium 20. A plurality of remote user devices including a remote user device 30 is operably coupled to, and in communication with, the functional module 14 via a network 35. In one embodiment, the functional module 14 is also in communication with a plurality of sources, such as a system used to route aircraft to meet maintenance requirements ("JMOCA source") 32, a system that contains stations characteristics ("MAPS source") 33, personnel, such as a user who is responsible for tagging non-routine maintenance items ("TMOD source") 40, a routine workload source 45, and other sources 50. In one embodiment, the functional module 14 receives data relating to transportation systems from the plurality of sources via the network 35. In one embodiment, the functional module 14 receives data relating to transportation vehicles from the plurality of sources via the network 35. In one embodiment, the functional module 14 receives data relating to an airplane 55 from the plurality of sources via the network 35. In one embodiment, the functional module 14 is also in communication with a plurality of stations, such as station A, B, C, D . . . N. In one embodiment, information or data is shared or transferred between all components within the system 10 via the network 35. In one embodiment, the system 10 provides the ability to plan and assign a maintenance "workload" or schedule of upcoming maintenance items, for multiple maintenance items. In one embodiment, the system 10 plans and assigns maintenance workload for line maintenance stations within the transportation system, the line maintenance stations being stations that complete routine maintenance items as well as non-routine maintenance items. In one embodiment, routine maintenance items are maintenance items that have a repetitive or recurrent repair interval. In one embodiment, a recurrent repair interval is an interval associated with a repair that recurs based upon a number of hours, cycles, or calendar days. In one embodiment, non-routine maintenance items (FMRs) are maintenance items that are not routine maintenance items. That is, a non-routine maintenance item is a maintenance item without a recurrent repair interval. In one embodiment, a non-routine maintenance item is a maintenance item that has an irregular interval, such as a maintenance item associated with a broken arm rest. In one embodiment, the workload can be created or planned in any defined time horizon, or forecast horizon. In one embodiment, a short-term planning window extends up to fourteen calendar days, although the system 10 places no restriction on the number of days for which upcoming maintenance can be planned. In one embodiment, multiple maintenance items assigned to a particular day at a station constitutes that day's bill-of-work (BOW) for that station for that day. In one embodiment, the system 10 provides a comprehensive tooling framework to proactively plan and update the BOWs for all the stations within the transportation system, regardless of the station's geographical location or capabilities. In one embodiment, each station's BOW includes FMRs and routine maintenance items. In one embodiment, the system 10 includes a methodical approach of reviewing and tagging each type of maintenance item, resulting in a streamlined workflow of maintenance from its inception to its completion.

In an exemplary embodiment, the functional module 14 is a web application server, which in several exemplary embodiments includes and/or executes one or more web-based programs, Intranet-based programs, and/or any combination thereof. In an exemplary embodiment, the network 35 includes the Internet, one or more local area networks, one or more wide area networks, one or more cellular networks, one or more wireless networks, one or more voice networks, one or more data networks, one or more communication systems, and/or any combination thereof.

Figure 2:
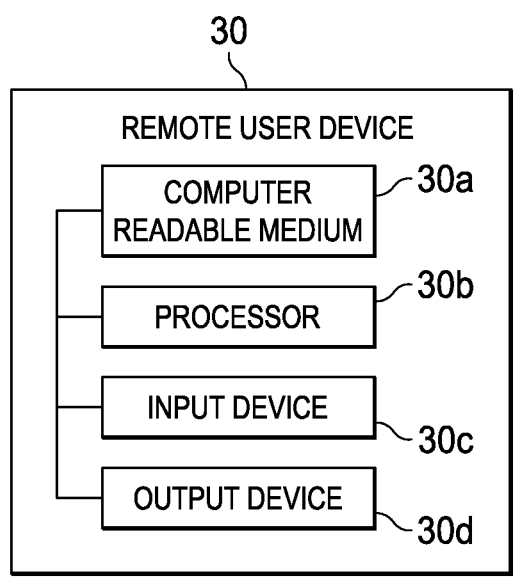
FIG. 2 is a diagrammatic illustration of the remote user device of FIG. 1, according to an exemplary embodiment.

In an exemplary embodiment, as illustrated in FIG. 2 with continuing reference to FIG. 1, the remote user device 30 includes a computer readable medium 30a, a processor 30b, an input device 30c, and an output device 30d. In an exemplary embodiment, instructions accessible to, and executable by, the processor 30b are stored in the computer readable medium 30a. In an exemplary embodiment, web browser software is stored in the computer readable medium 30a. In an exemplary embodiment, the input device 30c and the output device 30d include a graphical display, which, in several exemplary embodiments, is in the form of, or includes, one or more digital displays, one or more liquid crystal displays, one or more cathode ray tube monitors, and/or any combination thereof. In an exemplary embodiment, the output device 30d includes a graphical display, a printer, a plotter, and/or any combination thereof. In an exemplary embodiment, the input device 30c is the output device 30d, and the output device 30d is the input device 30c.

In several exemplary embodiments, the remote user device 30 is a thin client and the functional module 14 controls at least a portion of the operation of the remote user device 30. In several exemplary embodiments, the remote user device 30 is a thick client. In several exemplary embodiments, the remote user device 30 functions as both a thin client and a thick client. In several exemplary embodiments, the remote user device 30 is, or includes, a telephone, a personal computer, a personal digital assistant, a cellular telephone, other types of telecommunications devices, other types of computing devices, and/or any combination thereof. In several exemplary embodiments, the remote user device 30 includes a plurality of remote user devices. In several exemplary embodiments, the remote user device 30 is, or at least includes, one or more of the functional module 14, the computer processor 15, the computer readable medium 20, the database 25 and/or any combination thereof.

In an exemplary embodiment, the system 10 includes a computer program including a plurality of instructions, data, and/or any combination thereof. In an exemplary embodiment, the system 10 is an application written in, for example, HyperText Markup Language (HTML), Cascading Style Sheets (CSS), JavaScript, Extensible Markup Language (XML), asynchronous JavaScript and XML (Ajax), and/or any combination thereof. In an exemplary embodiment, the system 10 is a web-based application written in, for example, Java or Adobe Flex, which pulls real-time information from the remote user device 30, the functional module 14, and/or the plurality of sources. In an exemplary embodiment, the system 10 pulls real-time information from the remote user device 30, the functional module 14, and/or the plurality of data sources, upon the execution, opening or start-up of the system 10. In an exemplary embodiment, the system 10 is a web-based application written in, for example, Java or Adobe Flex, which pulls real-time information from the remote user device 30, the functional module 14, and/or the plurality of data sources, automatically refreshing with latest information every, for example, 45 seconds.

Figure 3:
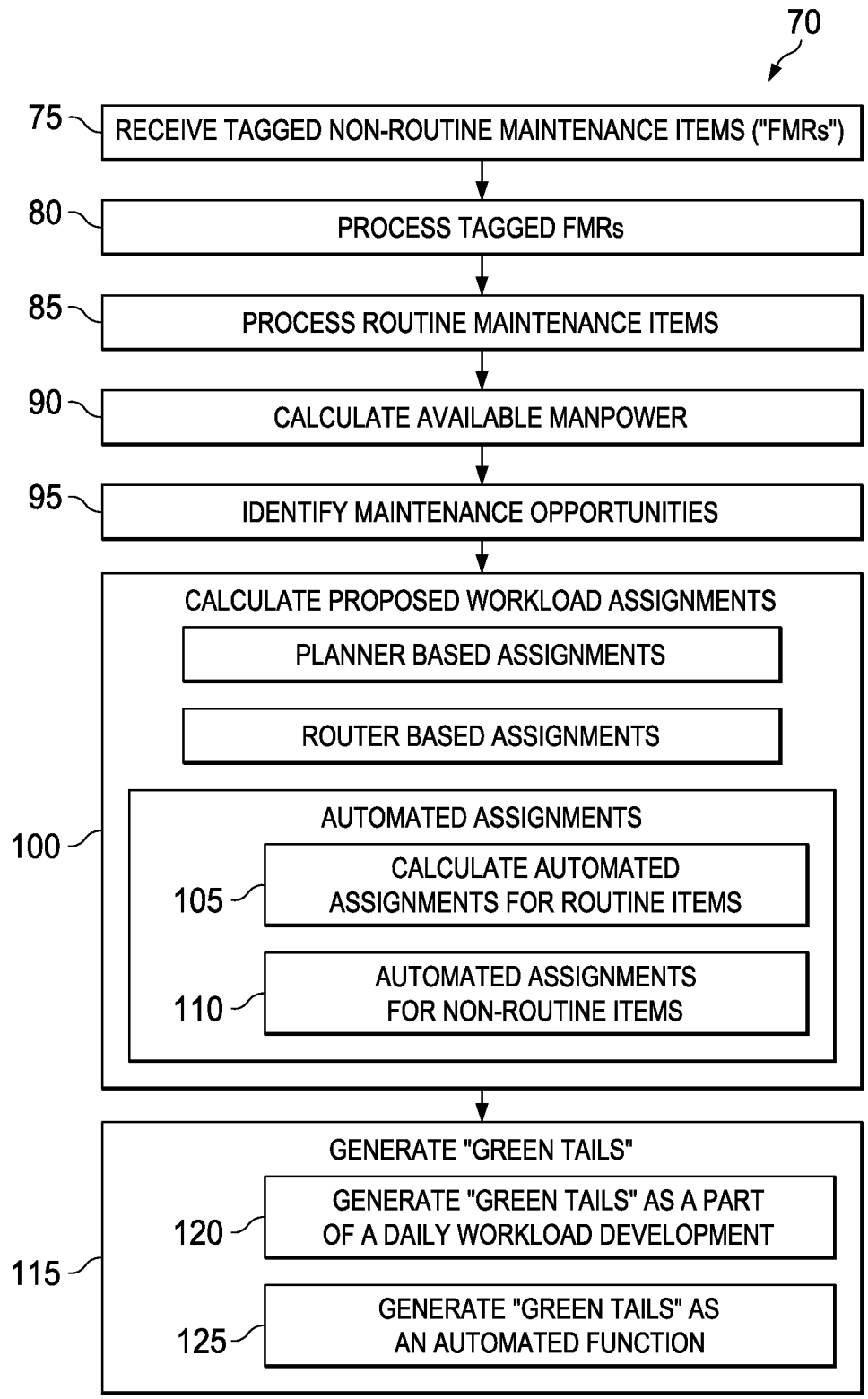
FIG. 3 is a flow chart illustration of a method of operating the system of FIG. 1, according to an exemplary embodiment.

In an exemplary embodiment, as illustrated in FIG. 3 with continuing reference to FIGS. 1-2, a method of managing maintenance items within the transportation system, by operating the system 10, is generally referred to by the reference numeral 70. In one embodiment, the method 70 includes receiving tagged records for non-routine maintenance items (FMRs) at step 75, processing Tagged FMR records at step 80, processing routine maintenance items at step 85, receiving manpower data at step 90, receiving aircraft routing data at step 95, calculating proposed workload assignments at step 100, which may include calculating automated assignments for routine items at step 105 and calculating automated assignments for non-routine maintenance items at step 110, and generating "green tails" at step 115, which may include generating "green tails" as a part of a daily workload development at step 120 and generating "green tails" as an automated function at step 125. In one embodiment, historical data is also received by the system 10, with the historical data including historical maintenance data, historical manpower data, historical aircraft routing data, and historical assignments.

Figure 4:
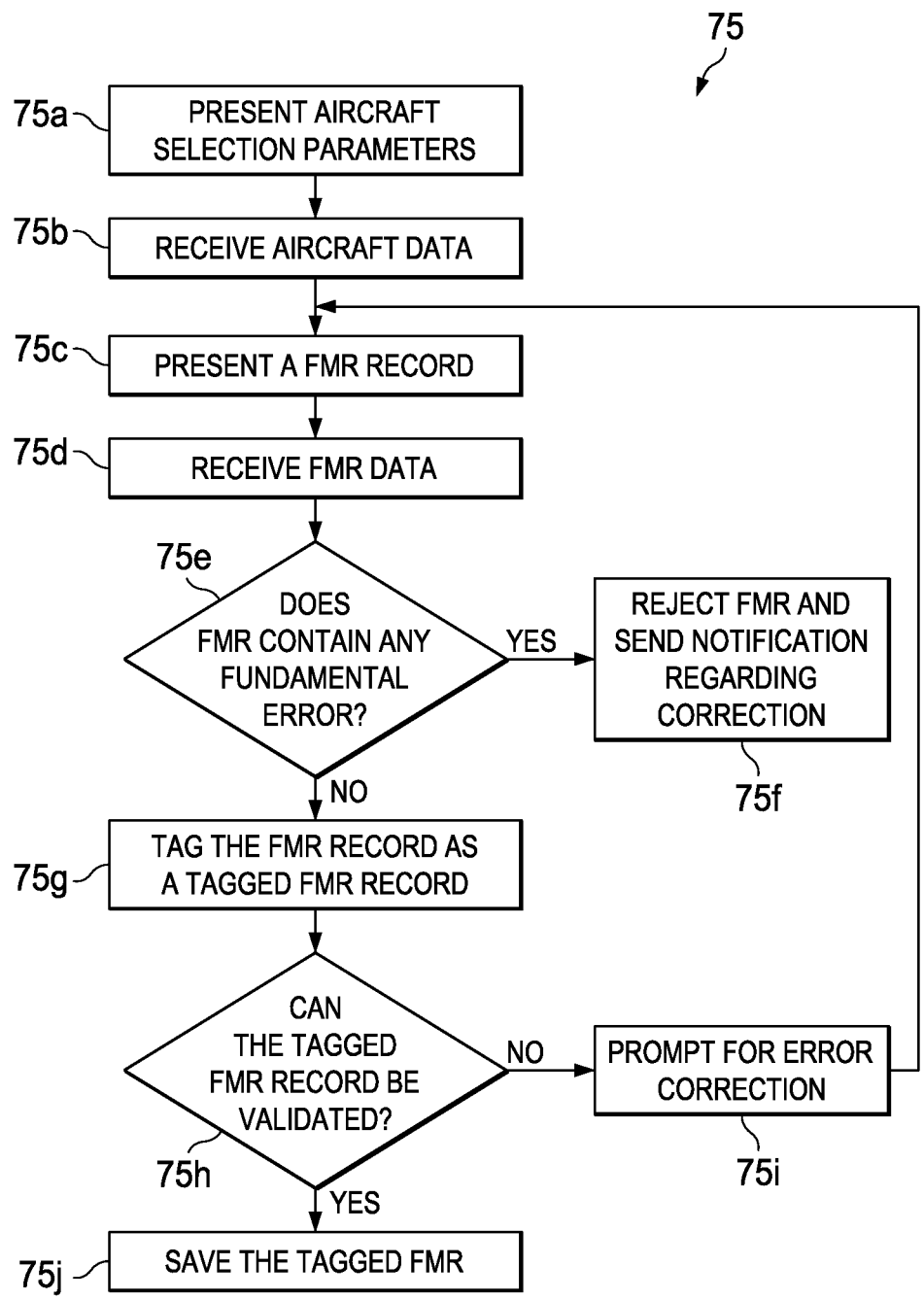
FIG. 4 is a flow chart illustration of a step of the method of FIG. 3, according to another exemplary embodiment.

In an exemplary embodiment, at the step 75, the system 10 receives tagged records relating to non-routine maintenance items (FMR records). In an exemplary embodiment, as illustrated in FIG. 4 with continuing reference to FIGS. 1-3, the step of receiving Tagged FMR records 75 includes sub-steps of: presenting aircraft selection parameters at step 75a, receiving aircraft data at step 75b, presenting a FMR record at step 75c, receiving FMR data at step 75d, determining whether the FMR record contains any fundamental errors at the step 75e and rejecting the FMR record and sending a notification regarding correction at step 75f if the FMR record does contain a fundamental error, tagging the FMR record as a Tagged FMR record at step 75g if the FMR record does not contain any fundamental errors, determining whether the Tagged FMR can be validated at step 75h, prompting for error correction if the Tagged FMR cannot be validated at step 75i, and saving the Tagged FMR record at step 75j if the Tagged FMR record can be validated at the step 75i.

Figure 5:
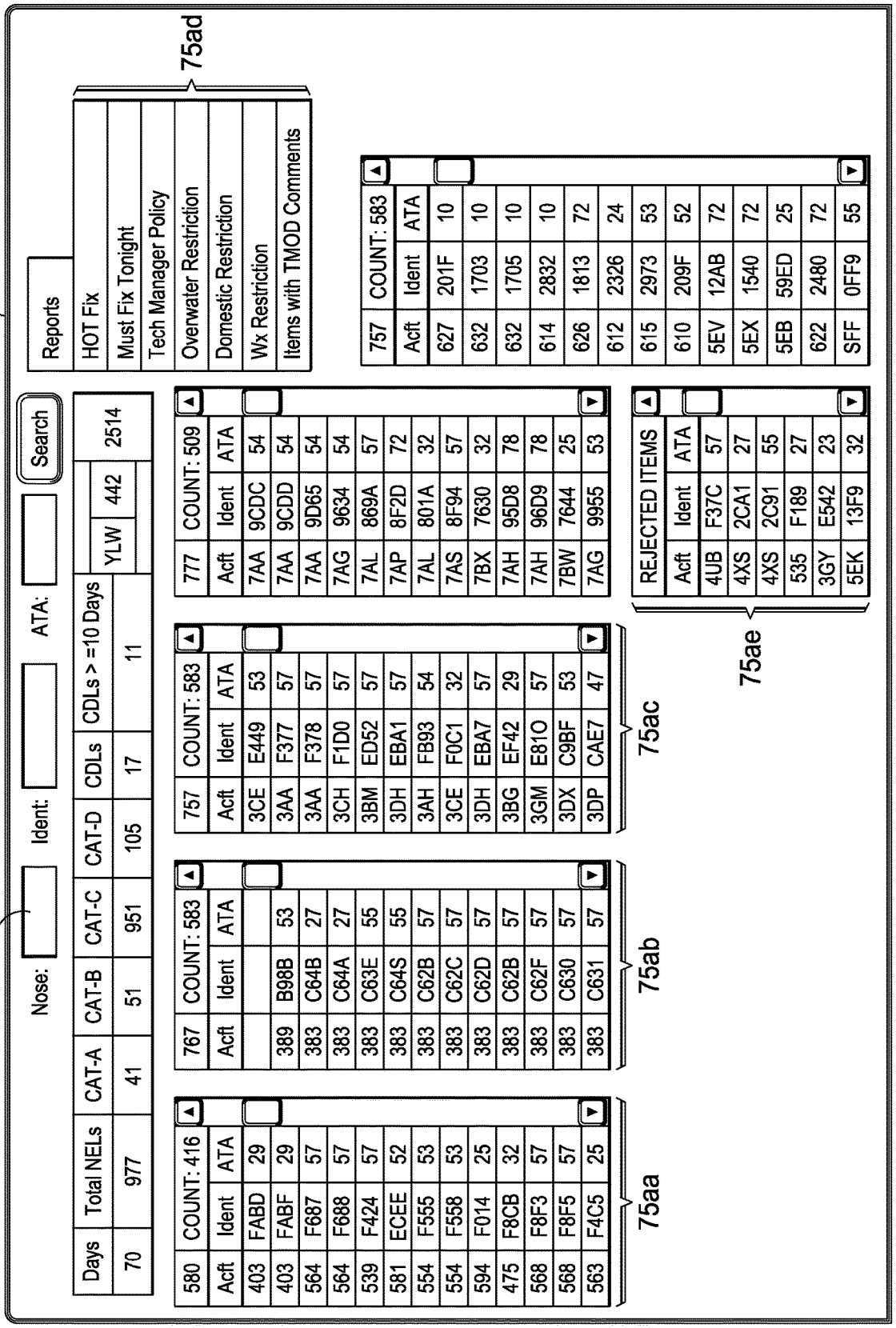
FIG. 5 is a diagrammatic illustration of the remote user device of FIG. 2, according to an exemplary embodiment.

In an exemplary embodiment, at the step 75a, the system 10 presents aircraft selection parameters. In an exemplary embodiment, the system 10 presents aircraft selection parameters on the output device 30d as shown in FIG. 5. In some embodiments, the aircraft selection parameters include aircraft nose number "Acft," Identification details "Ident," and ATA information by groupings, such as grouping 75aa associated with a 580 fleet, grouping 75ab associated with a 767 fleet, grouping 75ac associated with a 757 fleet, grouping by reports in a grouping 75ad, and grouping by rejected items in a grouping 75ae. Before, during or after the step 75a, the system 10 receives aircraft data at the step 75b. In one embodiment, and as shown in FIG. 5, the system 10 receives aircraft data through the use of text boxes, such as a text box 75*ba*. However, the system 10 can receive aircraft data in a variety of ways, such as through the use of voice recognition software. In one embodiment, the aircraft data received in step 75*b* is associated with a selected aircraft. That is, a user selects an aircraft using the aircraft selection parameters from the step 75*a*. Before, during or after the step 75*b*, the system 10 presents a FMR record associated with the selected aircraft at the step 75*c*. In an exemplary embodiment, the system 10 can present a FMR record to a user using the output device 30*d*. In an exemplary embodiment, the system 10 can present a FMR record in an editable version, as shown in FIG. 6, or a summarized version, as shown in FIG. 7. Before, during or after the step 75*c*, the system 10 receives FMR data at step 75*d*. In one embodiment and as shown in FIG. 6, the system 10 receives FMR data from a user using a text-box entry system 75*ca*, a drop-down menu 75*cb*, selection boxes 75*cc*, etc. However, the system 10 can receive FMR data in a variety of ways, such as through the use of voice recognition software. In one embodiment, FMR data can include a flight allowance, which is an appropriate time by which the FMR should be completed. In one embodiment, the flight allowance can be expressed as a unit of hours, cycles, or calendar days by which the FMR must be completed. In one embodiment, the flight allowance can be expressed as "hot Fix/must be done tonight," which indicates that the FMR requires immediate attention. In one embodiment, the flight allowance is a repair deadline and is associated with an amount of time in which the FMR should be completed. In one embodiment, the FMR data can include location, which describes where the FMR can be performed, such as a Class 1 station, a Class 2 station, or one or more stations. In one embodiment, the FMR data can include touch time, which is the required aircraft time on the ground for the FMR to be performed and excludes passenger loading/unloading, parking, and any other activities required outside of actual maintenance work. In one embodiment, touch time is the general and avionics mechanic manhours required to perform the work. In one embodiment, the FMR data can also include "not assignable before" data, which includes any threshold limit before which the FMR cannot be performed. In one embodiment, the FMR data can also include miscellaneous data, such as a various restrictions and notes associated with the aircraft associated with the FMR record. Before, during or after the step 75*d*, the system 10 determines whether there is a fundamental error associated with the FMR record at the step 75*e*. In one embodiment, an example of a fundamental error is wrong categorization. Before, during or after the step 75*e* and if there is a fundamental error associated with the FMR record, then the system 10 rejects the FMR record and sends a notification regarding correction at step 75*f*. Before, during or after the step 75*e* and if there is not a fundamental error associated with the FMR record, then the system 10 tags the FMR record as a Tagged FMR record at step 75*g*. In one embodiment, a Tagged FMR record is a FMR record that has been assessed or evaluated by the user. In one embodiment, the user is one who is responsible for tagging non-routine maintenance items ("TMOD source") 40. Before, during or after the step 75*g*, the system 10 determines whether the Tagged FMR record can be validated at step 75*h*. In one embodiment, validation involves detecting any inherent conflict between the FMR data. Before, during or after the step 75*h* and if the Tagged FMR record cannot be validated, then the system 10 prompts for error correction at step 75*i* and the next step is 75*c*, at which the system 10 presents the FMR record. Before, during or after the step 75*h* and if the Tagged FMR record can be validated, then the system 10 saves the Tagged FMR record at step 75*j*. In one embodiment, the system 10 saves the Tagged FMR record in the database 25. In one embodiment, after the step 75, the Tagged FMR records become eligible for processing at the step 80.

Figure 8:
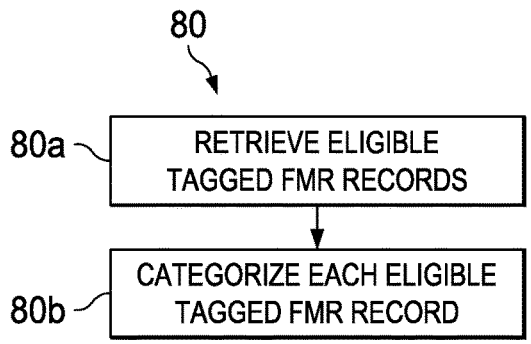
FIG. 8 is a flow chart illustration of a step of the method of FIG. 3, according to another exemplary embodiment.

Before, during or after the step 75, the system 10 processes the Tagged FMR records at the step 80. In an exemplary embodiment, as illustrated in FIG. 8 with continuing reference to FIGS. 1-3, the step of processing Tagged FMR records 80 includes sub-steps of retrieving all eligible Tagged FMR records at step 80*a* and categorizing each eligible Tagged FMR records at step 80*b*. In an exemplary embodiment, at the step 80*a*, the system 10 retrieves all eligible Tagged FMR records at the step 80*a*. In an exemplary embodiment, eligible Tagged FMR records are Tagged FMR Records that have not been categorized as either requiring immediate attention or as a regular FMR record. Before, during or after the step 80*a*, the system 10 categorizes each eligible Tagged FMR record at the step 80*b*. In an exemplary embodiment, each eligible Tagged FMR record is categorized as either needing immediate attention or as a "regular" FMR record, which does not require immediate attention. In an exemplary embodiment, each eligible Tagged FMR record is categorized as an FMR requiring immediate attention if the FMR associated with the Tagged FMR record requires immediate attention or if, based on actual routing data, the FMR associated with the Tagged FMR record is projected to exceed its allocated time if it is not performed immediately. In one embodiment, the system 10 reviews the FMR data received at the step 75*c* to determine if the FMR associated with the Tagged FMR record requires immediate attention. Otherwise, each eligible Tagged FMR record is categorized as a regular FMR record. In one embodiment, actual routing data is data associated with current and planned flight paths for each aircraft within the transportation system.

Figure 9:
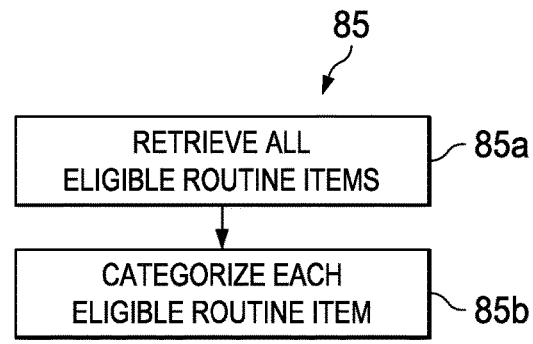
FIG. 9 is a flow chart illustration of a step of the method of FIG. 3, according to another exemplary embodiment.

Before, during or after the step 80, the system 10 processes routine maintenance items at step 85. In an exemplary embodiment, as illustrated in FIG. 9 with continuing reference to FIGS. 1-3, the step of processing routine maintenance items 85 includes sub-steps of retrieving all eligible routine items at step 85*a* and categorizing each eligible routine item at step 85*b*. In an exemplary embodiment, at the step 85*a*, the system 10 retrieves all eligible routine items that meet threshold limits. In an exemplary embodiment, an eligible routine item is a routine maintenance item that has not already been categorized as a routine item that requires immediate attention or as a regular routine item. In one embodiment, routine maintenance items relate to periodic checks, such as special item cards and component checks. In one embodiment, an engineering change order is considered a routine maintenance item even though an engineer change order does not have a recurrent routine interval. In an exemplary embodiment, a routine maintenance item is associated with an "allowable," or repair interval, that is a unit of time expressed in aircraft flying hours, cycles or calendar days indicating the interval of the maintenance. For example, the allowable for a specific routine maintenance item might be 100 hours, which implies that it should be completed every 100 flying hours. In one embodiment, a "threshold" is an upper limit over the allowable that makes the routine maintenance item due for maintenance once the threshold is reached, regardless of the allowable. In one embodiment, the repair interval is a repair deadline and is associated with an amount of time in which the routine maintenance item should be completed. Before, during or after the step 85*a*, the system 10 categorizes each eligible routine item that meets threshold limits at the step 85*b*. In one embodiment, categorizing eligible routine items that meets threshold limits is accomplished through the use of a mixed-integer program, with parameters that can be described as follows:

TTG is the Time to Go or the time left on an eligible routine item before it becomes due;

TWD is the Time When Due or the final date/time when an eligible routine item becomes due; and TST is the Total Ship Time of the aircraft (expressed in flying hours, cycles, or calendar days).

In an exemplary embodiment, using the foregoing mixed-integer parameters, the mixed-integer program used at the step 85*b* can be mathematically written as follows:

Calculate:

$$TTG(item) = \min((TWD-TST(hours), TWD-TST(cycles), TWD-TST(days))) \qquad (1)$$

In one embodiment, if TTG(item)=0 or if, based on actual routing data, the eligible routine item is projected to exceed its allowable if it is not performed immediately, then the eligible routine item is categorized as a routine item requiring immediate attention. If TTG(item)≠0 or if the eligible routine item is not projected to exceed its allowable if it is not performed immediately, then the eligible routine item is categorized as a regular routine item.

Figure 10:
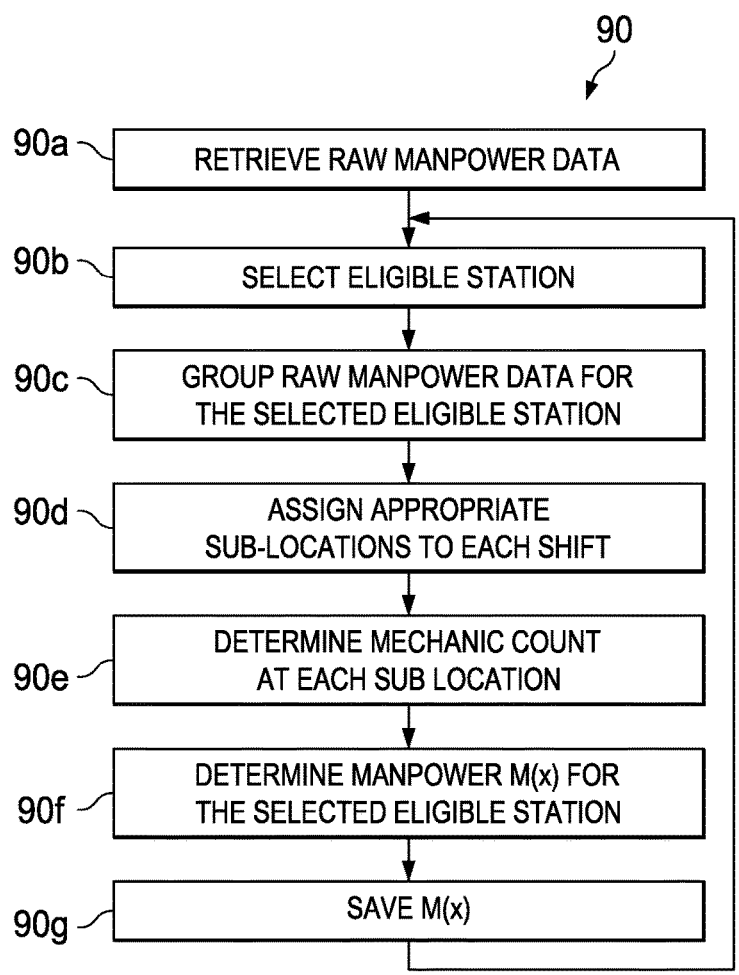
FIG. 10 is a flow chart illustration of a step of the method of FIG. 3, according to another exemplary embodiment.

Before, during or after the step 85, the system 10 calculates available manpower, or Manpower M(x) at the step 90. In an exemplary embodiment, as illustrated in FIG. 10 with continuing reference to FIGS. 1-3, the step of calculating available manpower 90 includes sub-steps of retrieving raw manpower data for each eligible station within the transportation system at step 90*a*, selecting an eligible station at step 90*b*, grouping raw manpower for the selected eligible station at step 90*c*, assigning appropriate sub-locations to each shift at the selected eligible station at step 90*d*, determining the mechanic count at each sub-location at step 90*e*, determining Manpower M(x) for the selected eligible station at step 90*f*, saving M(x) at step 90*g*, and repeating the steps 90*b*-90*g* until there are no more eligible stations. In one embodiment, raw manpower data includes a headcount of expected employees, staff, or mechanics during a specific time period that can complete the maintenance items. In one embodiment, stations within the transportation system have unique capabilities, such as crew skills, work hours, types of work performed, sub-locations where work can be performed, aircraft parking capabilities, etc. In one embodiment, the system 10 integrates these types of capabilities of each station to validate and optimize each maintenance item assignment against that station. For example, if a maintenance item requires a hangar and no hangars are available at a specific station, then an assignment of the maintenance item to that specific station is prevented by the system 10. In an exemplary embodiment, at the step 90*a*, the system 10 retrieves raw manpower data for each station within the transportation system. In one embodiment, the system 10 retrieves raw manpower data for each station within the transportation system from the MAPS source 33. In one embodiment, the system 10 retrieves data relating to each station's capabilities from the MAPS source 33. Before, during or after the step 90*a*, the system 10 selects an eligible station at the step 90*b*. In one embodiment, an eligible station is a station whose Manpower M(x) needs to be determined. Before, during or after the step 90*b*, the system 10 groups raw manpower data for the selected eligible station at the step 90*c*. In one embodiment, the system 10 groups raw manpower for the eligible station by overnight shifts and by date. In one embodiment, raw manpower data for the eligible station is consolidated as total station capacity per night. In an exemplary embodiment, only overnight shifts are considered for the purposes of calculating workload assignments. Before, during or after the step 90*c*, the system 10 assigns appropriate sub-locations to each overnight shift at the step 90*d*. In one embodiment, each station's capacity is sub-categorized into smaller functional units, such as hanger and terminal, which indicate the sub-locations where the capacity is. Before, during or after the step 90*d*, the system 10 determines the mechanic count at each sub-location at the step 90*e*. In one embodiment, for each hanger and terminal sub-categorization, the capacity is further divided into general and avionics, which indicate the work specialization of the mechanics. In one embodiment, the system 10 determines the general mechanic count and the avionics mechanic count at each sub-location at the step 90*e*. Before, during or after the step 90*e*, the system 10 determines Manpower M(x) for the selected eligible station at the step 90*f*. In one embodiment, determining Manpower M(x) is accomplished through the use of a mixed-integer program, with parameters that can be described as follows:

M(x) is Manpower for an selected eligible station x;

R(x) is raw manpower at the selected eligible station x;

D(x) is general deductions at the selected eligible station x;

S(x) is a shift utilization at the selected eligible station x;

RS(x) is a reserve capacity;

OT(x) is an Out of Service ("OTS") deduction; and n is the number of shifts for a given day.

In an exemplary embodiment, using the foregoing mixed-integer parameters, the mixed-integer program used at the step 90*f* can be mathematically written as follows:

Calculate:

$$M(x) = \left[\sum_{t=1}^{n}(R(x_t) - D(x_t)) \times S(x_t)\right] - RS(x) - OT(x) \qquad (2)$$

In an exemplary embodiment, the general deductions at the selected eligible station x are associated with non-productive time for mechanics. In one embodiment, general deductions include vacation, training, sickness, parking, contract, etc. In an exemplary embodiment, the shift utilization at the selected eligible station x is associated with the productive time of the mechanics by accounting for non-productive administrative activities such as breaks and meetings. In an exemplary embodiment, the typical shift utilization factor is 80%. In an exemplary embodiment, the reserve capacity at the selected eligible station x is associated with parking, towing, or other special activities pre-planned for the mechanics. In an exemplary embodiment, the Out of Service (OTS) deduction is associated with a special deduction applied when work is to be performed on any out of service aircraft. Before, during or after the step 90*f*, the system 10 saves the calculated M(x) for the selected eligible station at the step 90*g*. Before, during, or after the step 90*g*, the next step is the step 90*b* at which the system 10 selects another eligible station, repeating the steps 90*b*-90*g* until there are no more eligible stations. One embodiment of the MAPS source 33 is described in U.S. application Ser. No. 12/822,859, which is hereby fully incorporated herein by express reference thereto.

Before, during or after the step 90, the system 10 identifies maintenance opportunities at the step 95. In an exemplary embodiment, as illustrated in FIG. 11 with continuing reference to FIGS. 1-3, the step of identifying maintenance opportunities 95 includes sub-steps of retrieving raw aircraft routings containing multiple flight segments at step 95a, selecting an eligible aircraft at step 95b, grouping all flight segments of the selected eligible aircraft into "turns" at step 95c, filtering out "turns" with non-maintenance capable stations at step 95d, selecting an eligible turn at step 95e, and evaluating the selected eligible turn to determine if the selected eligible turn is a turnaround, is a termination, or neither at steps 95f-95h and 95j-95k. This process is repeated until all eligible turns associated with all eligible aircraft are evaluated. In an exemplary embodiment, at the step 95a, the system 10 retrieves all raw aircraft routings, which often contain multiple flight segments. Before, during or after the step 95a, the system 10 selects an eligible aircraft at the step 95b. In one embodiment, an eligible aircraft is an aircraft having eligible turns. Before, during or after the step 95b, the system 10 groups all flight segments associated with the selected eligible aircraft into "turns" at the step 95c. In one embodiment, a turn includes an aircraft routing turn containing inbound and outbound flight segments. Before, during or after the step 95c, the system 10 filters out turns with non-maintenance capable stations at the step 95d. In one embodiment, a non-maintenance capable station is a station at which maintenance cannot be performed. Before, during or after the step 95d, the system 10 selects an eligible turn at the step 95e. In one embodiment, an eligible turn is a turn that has not been marked as a termination, a turnaround, or has been previously ignored by the system 10. In one embodiment, a turnaround is a time slot during daytime that is long enough (perhaps a few hours) for maintenance to be performed. In one embodiment, a termination is a time slot late at night that stretches over midnight. Before, during or after the step 95e, the system 10 determines whether the eligible turn is marked as a maintenance opportunity or termination at the step 95f. Before, during or after the step 95f and if the system 10 determines the eligible turn is not marked as a maintenance opportunity or termination, the system 10 determines if actual ground time between the selected eligible aircraft's current and previous flight is greater than or equal to three hours and less than 6 hours (3 hrs≤x≤6 hours, where x is actual ground time between the current and previous flight) at step 95g. In one embodiment, ground time is associated with an amount of time between an arrival time of an aircraft at a maintenance station and the departure time of the aircraft from the maintenance station. If yes, then the system 10 designates the eligible turn as a "turnaround" at step 95h and the next step is step 95i. If no, then the system 10 ignores the eligible turn and the next step is the step 95i. Before, during, or after the step 95f and if the system 10 determines the eligible turn is marked as a maintenance opportunity or termination at the step 95f, the system 10 determines whether the eligible turn is associated with an actual ground time between the aircraft's current and previous flight that is greater than 6 hours and whether the arrival time of the inbound flight is earlier than 3 AM local time (x>6 hours and arrival time of the inbound flight earlier than 3 AM local time, where x=actual ground time between the current and previous flight) at step 95j. If yes, then the system 10 designates the eligible turn as a termination at step 95k and the next step is the step 95i. If no, then the system 10 ignores the eligible turn and the next step is the step 95i. In one embodiment, when designating a turn as a termination or turnaround, the system 10 notes an aircraft number, arrival and departure flight information, origination and arriving station, total ship time to each arrival or departure, as well as projected ground times at each stop for the eligible turn. Before, during, or after the steps 95g, 95h, 95j, and 95k, the system 10 determines whether there is another eligible turn associated with the aircraft at the step 95i. If there is another eligible turn associated with the aircraft, then the next step is 95e. In one embodiment, this allows the system 10 to select another eligible turn so that every eligible turn associated with the selected eligible aircraft can be designated as either a "turnaround," a "termination" or ignored by the system 10. If there is not another eligible turn associated with the selected eligible aircraft, then the next step is the step 95b. In one embodiment, this allows the system 10 to select another eligible aircraft so that every aircraft having eligible turns is considered within the step 95. In one embodiment, the JMOCA source 32 provides the system 10 with real-time aircraft routing data so that all assignments are matched against the most up-to-date flight path information. In one embodiment, the system 10 performs real-time validations against all assignments. In one embodiment, the system 10 contains built-in intelligence to detect any changes to the routing data within the JMOCA source 32 to a previously made assignment. In such cases, the system 10 proactively drops the assignment and alerts the user so that the user can re-plan that maintenance item. In a similar scenario, a route-restricted maintenance item may be dropped due to a change in the routing.

Before, during or after the step 95, the system 10 calculates proposed workload assignments at the step 100. In an exemplary embodiment, a proposed workload assignment is a grouping of maintenance items assigned to at least one station. In an exemplary embodiment, the assignments can be planner based assignments, router based assignments, or automated assignments.

In an exemplary embodiment, planner based workload assignments are created by a user, such as a planner (the final approver), that plans out the workload by placing maintenance items, such as FMRs requiring immediate attention, regular FMR records, routine items requiring immediate attention, and regular routine records, in a calendar as the maintenance items appear in a planning queue. In one embodiment, a planner assigns the maintenance items to appropriate maintenance opportunities, such as terminations and turnarounds. In one embodiment, as maintenance items are assigned, the system 10 validates the assignment against a set of assignment rules to ensure the assignments and all related interdependencies are valid. In one embodiment, appropriate warnings and alerts are generated and displayed to the user. In one embodiment, the set of assignment rules used are: an assignment should be associated with a valid maintenance opportunity (termination or turnaround); an assignment is associated with the correct aircraft; a station has adequate manpower capacity (a supervisory override is provided for over-allocation); a station is capable of performing the maintenance (not all stations can perform all maintenances); a maintenance item's station restrictions (e.g. Class I, II or select stations) match the candidate station; and other rules pertaining to exclusions, blocked, subsuming and packaged items.

In an exemplary embodiment, router based workload assignments are created by a user, such as a router, who routinely makes certain assignments to correspond with the aircraft routing decisions that they make. In one embodiment, a router's main focus is certain types of FMRs with route restrictions and other items requiring routing changes. In such cases, assignments are made on those aircraft, and those maintenance item assignments flow into the system 10 in a real-time fashion. In one embodiment, router assignments are subject to the set of assignment rules and if the assignment does not comply with of any of those rules, then the assignment is rejected and the rejection is communicated back to the router with a reason. In one embodiment, validated assignments appear in a calendar area displayed on the output device 30*d* in "pending" status subject to review and final approval by a planner. In one embodiment, a planner has the capability to reject such assignments. In such cases, the planner is then prompted to enter reasons for the rejection along with a suggested alternate routing plan, if that is necessary. In one embodiment, this ensures that there is tight coordination and communication between the router and the planner to arrive at an integrated workload plan.

In an exemplary embodiment, determining automated workload assignments is accomplished through the use of a set of algorithms or optimization logic or both. In one embodiment, the automated workload assignments serve as advisories to the planner and are displayed in a calendar area on the output device 30*d* in pending status for her approval or changes. In an exemplary embodiment there are two types of model-based assignments, one is associated with the current 24 hour cycle ("24×7 Model") and the other is associated with a period of time beyond the current 24 hour cycle, the ("Future Forecast Model"). In one embodiment, the 24×7 Model and the Future Forecast Model utilize data associated with the steps 75-95. In addition, and in one embodiment, these models also enforce additional optimization techniques to ensure that the most "optimal" workload assignment is established. An example of an optimization rule is "target yield" for routine (repetitive) maintenance items. In one embodiment, yield is a configurable, quantitative measure that indicates that a maintenance item is due by a certain percentage of its repair interval. As an example, an algorithm may detect that a routine work item is to be scheduled on an aircraft in 4 days given its target yield of 85%. However, if the flight schedule of this aircraft indicates that it is about to embark on a long haul journey tomorrow and will not return to a maintenance-capable station until the 5th day, it may assign it today as a suitable maintenance capable station. These types of optimizations allow the system 10 to achieve a workload assignment that is balanced against multiple factors resulting in the most optimal and cost-effective solution.

In one embodiment, the 24×7 Model assignments are used in the planner based assignments as they reflect the most up to-date changes on the ground. In one embodiment, these up to-date changes could include aircraft routing changes, station manpower changes such as Out of Service (OTS) allocations, last minute crew deductions, and weather events, which are all potential events which could disrupt the workload plan for the day. In one embodiment, the 24×7 model quickly reacts to any of these external triggers by re-assigning and re-allocating workload across stations. In one embodiment, any changes and new assignments appear in a calendar area of the output device 30*d* in "ending" status subject to the planner's review and approval. However, in one embodiment, certain types of maintenances are exempt from the planner's review. In one embodiment, the types of maintenance exempt from the planner's review include mandatory minimum checks, which must be performed on all aircraft, FMRs authored by pilots, and other last-minute items discovered late in the day.

In one embodiment, there are two types of Future Forecast Models, a first type based on routine maintenance items and a second type based on non-routine maintenance items.

In one embodiment, the primary aim of the first type is to produce a workload plan of upcoming routine item maintenances across stations in the transportation system. In one embodiment, this first type of forecast is performed in order to arrive at an optimal workload assignment, given various configurable parameters such as the yield. In one embodiment, the methodology and mixed-integer program or algorithm described below is for a forecast for active aircraft across a range of opportunities. In one embodiment, the results are aggregated to provide a system-wide forecast. In one embodiment, parameters used by the mixed-integer program can be described as follows:

A is a set of all active aircraft; $a \in A$.

M is a set of routine maintenance items; $m \in M$.

BC is a set of B-check maintenance items; $b \in BC$; $BC \subseteq M$.

AM is a set of valid aircraft maintenance items that are routine items; $AM = \{M \times A | m_i a_i$ is a valid routine aircraft maintenance item$\}$.

O is a set of maintenance opportunities; $o \in O$.

ASM is a set of valid, existing assignments for an $am \in AM$, and $o \in O$; $ASM = \{AM \times O | m_i a_i o_i$ is a valid assignment$\}$.

TST(am,o) is the Total Ship Time (in units of hours, cycles, or days) of the aircraft maintenance am at opportunity o.

TWD(am) is the Time When Due (in units of hours, cycles, or days) and indicates the time when the aircraft maintenance am becomes due.

TWD is calculated as the minimum of the 3 units, i.e., TWD=min (TWD(am) hours, TWD(am) cycles, TWD (am) days).

Y(am) is the target yield of the maintenance item at the subfleet level and is expressed as a percentage.

YT(am) is the yield threshold with a value (in units of days, hours, or cycles) that indicates when the items should be performed to meet Y(am).

YT(am)=Y(am)*TWD(am). E.g., if the Target yield of an item is 85% and the next TWD is 25,000 hours, then YT=21250. When the TST equals or exceeds 21250, YT is met and the item becomes due.

ST(am) is the subsumed threshold and is the threshold value that indicates that a subsuming maintenance should be assigned if the difference between the TWDs of the subsumed and subsuming maintenance falls within this value. Let x be the subsumed item of the subsuming item, am. ST is applicable if $ST \leq |TWD(x) - TWD(am)|$.

BT(am) is the Block Threshold and is the threshold value that indicates that a blocking maintenance should be assigned if the difference between the TWDs of the blocking and blocked maintenance falls within this value.

BWT(am) is the Bill-of-Work threshold and is a plain value that indicates the threshold when this item should be assigned.

Figure 12A:
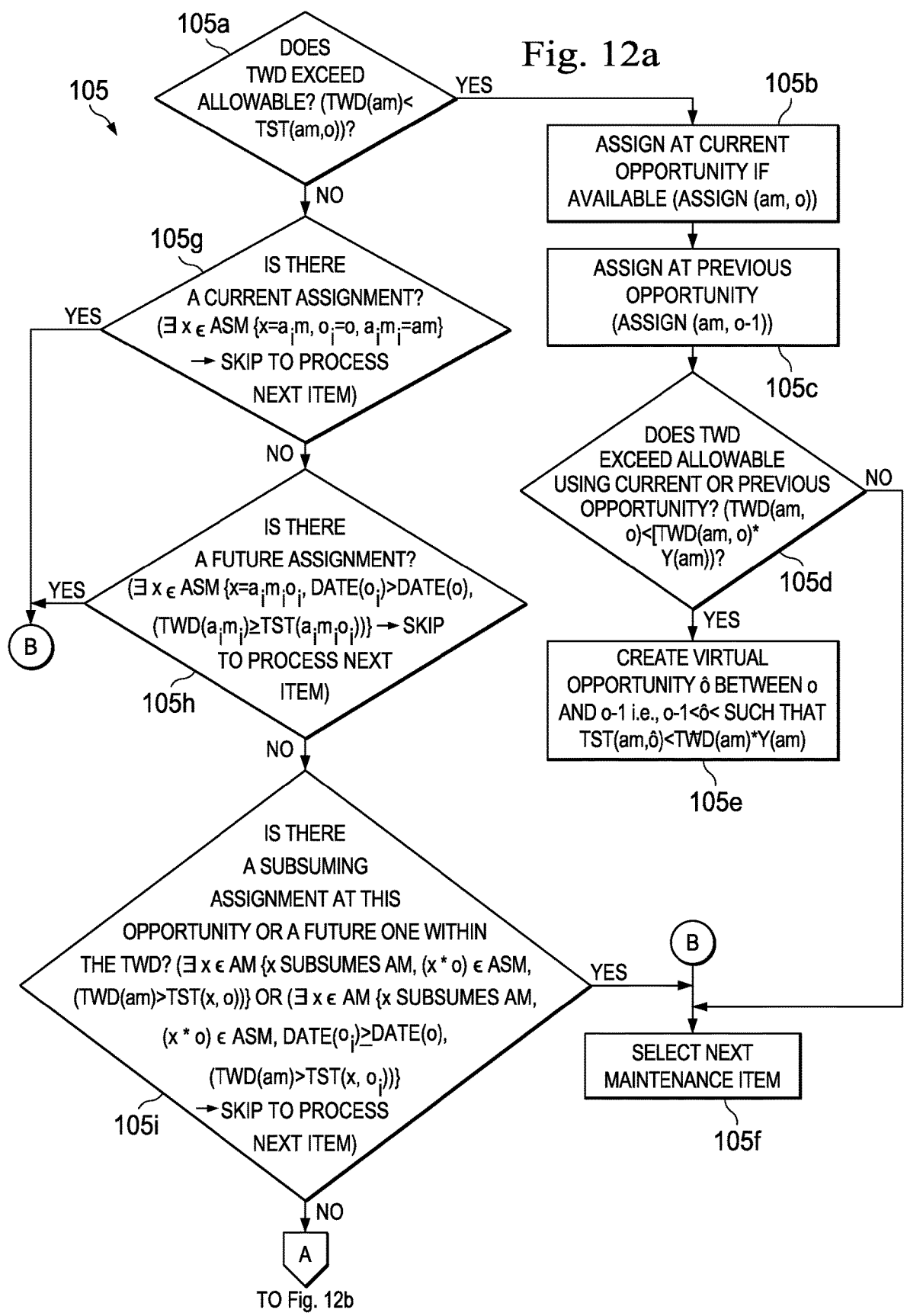
FIGS. 12a-12b together form a flow chart illustration of a step of the method of FIG. 3, according to another exemplary embodiment.
Figure 12B:
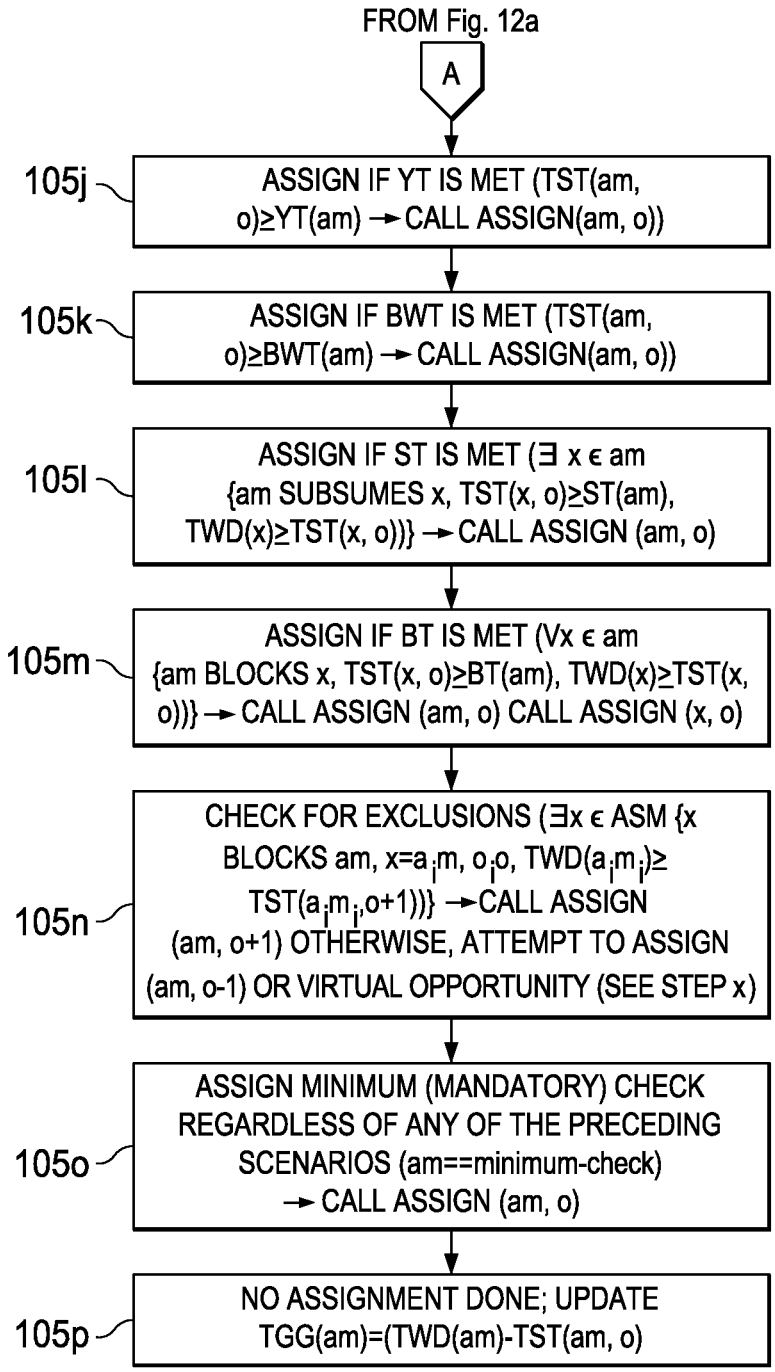

In an exemplary embodiment, the method of calculating proposed workload assignments for routine items 105 is illustrated in FIGS. 12*a* and 12*b*, with continuing reference to FIGS. 1-3. In an exemplary embodiment, at step 105*a*, the system 10 determines whether a maintenance item's Time When Due exceeds its repair interval, or allowable, (the Total Ship Time exceeds the Time When Due). If yes, then the system 10 assigns the maintenance item at a current opportunity, if available, at step 105*b*. If the system 10 cannot assign the maintenance item at a current opportunity at the step 105*b*, then the system 10 assigns the maintenance item at a previous opportunity at step 105*c*. Before, during, or after the step 105*c*, the system 10 determines whether the maintenance item's Time When Due exceeds its allowable using the current or previous opportunity at step 105d. Before, during or after the step 105d and if the maintenance item's Time When Due exceed its allowable using the current or previous opportunity, then the system 10 creates a virtual opportunity at step 105e. Before, during, or after the step 105d and if the maintenance item's Time When Due does not exceeds its allowable using the current or previous opportunity, then the system 10 does not perform further action relating to the maintenance item and selects a next maintenance item at step 105f, repeating the process using the next maintenance item. Before, during, or after the step 105a and if the maintenance item's Time When Due does not exceeds its allowable, then the system 10 determines if there is a current assignment at step 105g. If yes, then the system 10 does not perform further action relating to the maintenance item and selects the next maintenance item at the step 105f, repeating the process using the next maintenance item. If no, then the system 10 determines whether there is a future assignment at step 105h. If yes, then the system 10 does not perform further action relating to the maintenance item and selects the next maintenance item at the step 105f, to repeat the steps 105a-105e using the next maintenance item. If no, then the system 10 determines whether there is a subsuming assignment at this opportunity or a future one within the maintenance item's Time When Due at step 105i. In one embodiment, a subsuming assignment is a routine maintenance item that can subsume other routine maintenance items. That is, the subsuming item acts as a "higher item" when performed and all of the subsumed items are considered performed as well. For example, a B-check maintenance item (BC) subsumes an A-check maintenance item (AC) and therefore, when a B-check is performed on an aircraft, an A-check is also considered performed. In one embodiment, a B-check maintenance item is a subsuming maintenance item and a A-check maintenance item is a subsumed maintenance item. If yes, then the system 10 does not perform further action relating to the maintenance item and selects the next maintenance item at the step 105f. If no, then the system 10 assigns the maintenance item if the yield threshold (YT) is met at the step 105j. Before, during, or after the step 105j, the system 10 assigns the maintenance item if the bill of work threshold (BWT) is met at step 105k. Before, during, or after the step 105k, the system 10 assigns the maintenance item if the subsumed threshold (ST) is met at step 105l. Before, during, or after the step 105l, the system 10 assigns the maintenance item if the blocked threshold (BT) is met at step 105m. In one embodiment, blocking is a required packaging of maintenance items. For example, if item A blocks items B and C, then items B and C always have to be done with A, but A can be done independently. Before, during, or after the step 105m, the system 10 checks for exclusions at step 105n. In one embodiment, an exclusion is when two maintenance items cannot be assigned together. For example, if item A is excluded by B, neither of them can be assigned together. Before, during, or after the step 105n, the system 10 assigns minimum or mandatory checks at step 105o. Before, during, or after the step 105o and if no assignment is completed, then the system 10 updates the Time to Go (TTG) at step 105p.

In an exemplary embodiment, the system 10 attempts to utilize actual aircraft routings, however, when actual routings are exhausted, the system 10 resorts to artificial routing generation. Generating artificial routings to be used within the method of calculating workload assignments for routine items 105 can be performed through the use of a mixed-integer program. In one embodiment, parameters used by the mixed-integer program can be described as follows:

TMD is the target maintenance date.

LMD is the last maintenance date relating to the maintenance item.

MI is the average maintenance opportunity interval at the subfleet level calculated from historical data. It is interpreted as the interval of days when maintenance can be performed. For example, a value of 2.5 would mean that there is a maintenance opportunity available every 2.5 days. If this value is unavailable, a default value of 2 is used in an exemplary embodiment.

UH is the average flying hours per day at the subfleet level calculated from historical data. If this value is unavailable, a default value of 10 is used in an exemplary embodiment.

UC is the average flying cycles per day at the subfleet level calculated from historical data. If this value is unavailable, a default value of 2 is used in an exemplary embodiment.

S is a set of active subfleets; s ∈ S.

NXT_OPP is the next opportunity.

NMD is the next maintenance date.

TSC is the Total Ship Cycles.

DTG is the Days to Go and refers to the number of calendar days by which a particular maintenance item becomes due.

x is a random number such that 0≤x≤1.

In one embodiment, the mixed-integer program can be mathematically written as follows:

After initializing LMD to equal the last maintenance date from historical data, do for ∀s ∈ S until LMD≥TMD:

$$\text{NXT\_OPP} = \text{ceil}(MI_s + x) \quad (3)$$

$$\text{NMD} = \text{LMD} + \text{NXT\_OPP} \quad (4)$$

$$\text{Next TST} = \text{last TST} + (\text{NXT\_OPP} * UH_s) \quad (5)$$

$$\text{Next TSC} = \text{floor}(\text{last TSC} + (\text{NXT\_OPP} * UC_s)) \quad (6)$$

$$\text{Last TST} = \text{Next TST} \quad (7)$$

$$\text{Last TSC} = \text{Next TSC} \quad (8)$$

$$\text{LMD} = \text{NMD} \quad (9)$$

In an exemplary embodiment, calculating the workload of routine items using artificial routing using equations 3-9 is done for every active subfleet within the set of active subfleets until the Last Maintenance Date is greater than or equal to the Target Maintenance Date, and where the variable Last Maintenance Date (LMD) is initialized to equal the last maintenance date from historical data. In one embodiment, calculating the equations 3-9 results in: a virtual station "ZZZ" being assigned to a date associated with the Last Maintenance Date; the Next Total Ship Time calculated in equation (5) being associated with the date associated with the Last Maintenance Date; and the Next Total Ship Cycle calculated in equation (6) being associated with the date associated with the Last Maintenance Date. As the Last Maintenance Date is increased incrementally (until the Last Maintenance Date equals or is greater than the Target Maintenance Date), a plurality of dates and associated stations, Next Total Ship Time, and Next Total Ship Cycle are generated. In one embodiment, the plurality of dates and associated stations, Next Total Ship Time, and Next Total Ship Cycle are used by the system 10 in the step 105.

Figure 13:
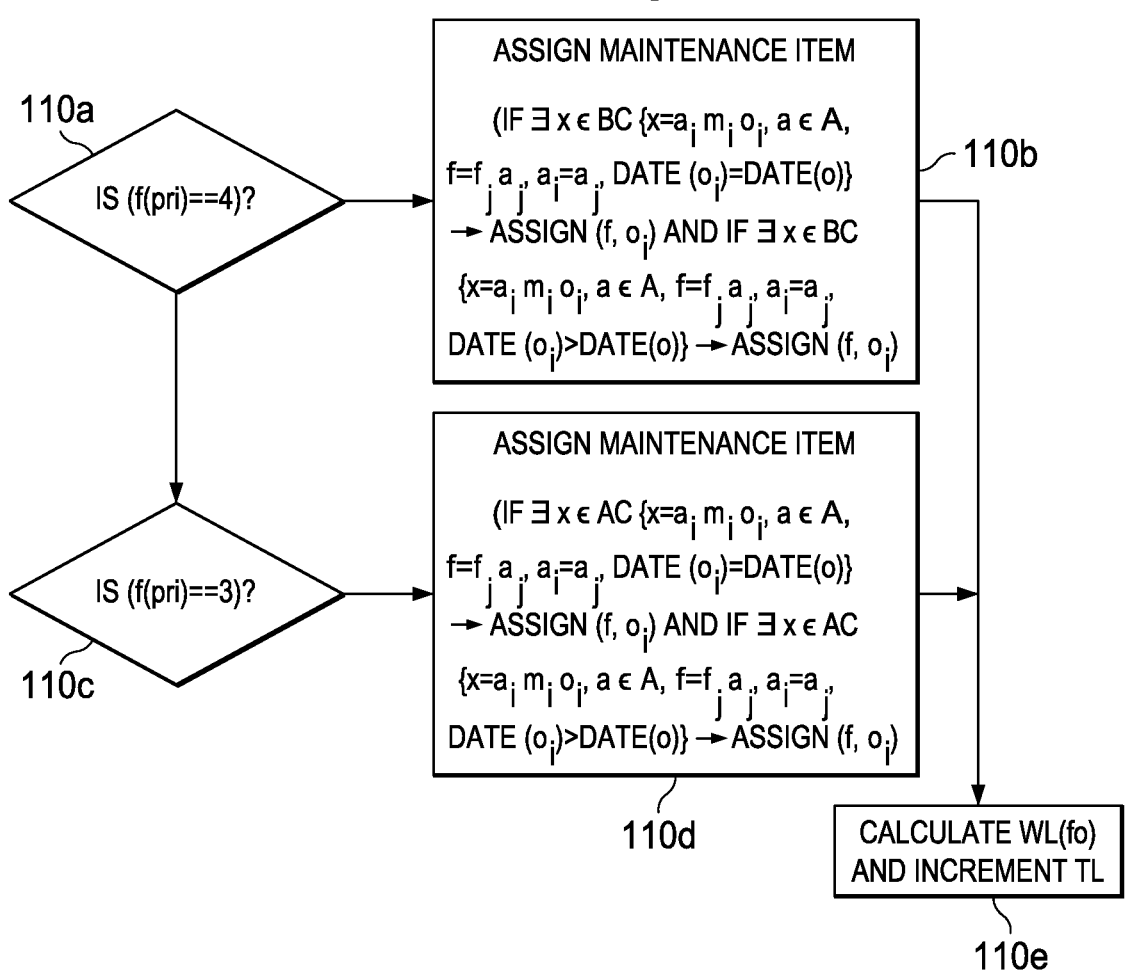
FIG. 13 is a flow chart illustration of a step of the method of FIG. 3, according to another exemplary embodiment.

In one embodiment, the primary aim of the second type of forecast model is to produce a workload plan for non-routine maintenance items. In one embodiment, forecasting non-routine maintenance items (FMRs) is more challenging as there are no recurrent repair intervals involved. In an exemplary embodiment, as partially illustrated in FIG. 13, with continuing reference to FIGS. 1-3, the step of calculating total workload for non-routine items 110 can include the system 10 initializing the total workload (TL) to zero. In one embodiment, the step 110 includes calculating total workload (TL) for non-routine items across all stations in the forecast horizon, given that if there is already a planner assignment, the planner assignment will not be changed. In one embodiment, this includes the system 10 evaluating each open FMR from the set of open FMRs to determine whether each open FMR has a priority of 4 at step 110a. In one embodiment, an open FMR is an existing maintenance item having a flight allowance associated with an amount of time in which the maintenance item should be completed, with the open FMR not associated with a recurrent repair interval. In one embodiment, the priority of 3 or 4 is associated with the flight allowance data. In one embodiment, a priority of 4 is associated with high priority status and a priority of 3 is associated with a low priority status. Before, during, or after the step 110a and if the open FMR has a priority of 4, then the system 10 assigns the open FMR to a maintenance opportunity at step 110b. In one embodiment, the system 10 assigns the open FMR at the step 110b to a maintenance opportunity if there is a B-check assignment associated with the maintenance opportunity. In one embodiment, the system 10 assigns the open FMR at the step 110b to a future opportunity if there is a b-check assignment associated with the future opportunity. Before, during, or after the step 110a and if the open FMR does not have a priority of 4, then the system 10 determines whether the open FMR has a priority of 3 at step 110c. Before, during, or after the step 110c and if the open FMR has a priority of 3, then the system 10 assigns the open FMR to a maintenance opportunity at step 110d. In one embodiment, the system 10 assigns the open FMR at the step 110d to a maintenance opportunity if there is an A-check assignment associated with the maintenance opportunity. In one embodiment, the system 10 assigns the open FMR at the step 110d to a future opportunity if there is an A-check assignment associated with the future opportunity. Before, during, or after the steps 110b and 110c, the system 10 calculates WL(fo) and increments the Total Workload at step 110e using a mixed integer program. In one embodiment, parameters used by the mixed-integer program can be described as follows:

A is a set of active aircraft; $a \in A$.

BC is the set of pre-assigned B check (routine maintenance items); $b \in BC$.

AC is the set of pre-assigned A-check (routine maintenance items); $c \in AC$.

F is the set of open FMR maintenances; $f \in F$.

S is the set of all maintenance stations; $s \in S$.

O is a set of all maintenance opportunities; $o \in \mathbf{0}$.

f(s) is a station constraint of FMR f; indicates at which stations that f can be performed; $f(s) \subseteq S$.

f(MhG) is the required general manhours to perform FMR f.

f(MhA) is the required avionics manhours to perform FMR f.

MAX_AGE is the assumed maximum number of days that an FMR can be in open status; usually 120 days.

CAT is an FMR category with respect to accomplishment rate; CAT $\in$ {FAST,MEDIUM,SLOW}. Generally, FMRs of FAST type get accomplished sooner than those of MEDIUM, which in turn get accomplished sooner than those of SLOW type.

$P(A_{CAT}, d)$ is the probability of FMRS of category CAT getting accomplished on a given day d. This is a computed value based on historical data; the probability is spread over d where d=[1, MAX_AGE].

$P'(A_{CAT}, d)$ is the adjusted probability of $P(A_{CAT}, d)$ based on maintenance opportunity;

f(pri) is the priority of FMR f; priority 4 FMRs get assigned with B-checks and priority 3 FMRs get assigned with A-checks.

WL(fo) is the workload (expressed in manhours) for FMR f at opportunity o;

TWL(d) is the total FMR workload for a given day d.

In an exemplary embodiment, using the foregoing mixed-integer parameters, the mixed-integer program can be mathematically written as follows:

Calculate:

$$P'(A_{cat,k}) / \left( \sum_{i=D_0}^{D} P(A_{cat,i})\{i \in D\} \right) \quad (10)$$

$$WL(fo) = [f(Mh_G + f(Mh_A)] * P'^{A_{cat,k}}) \quad (11)$$

$$TL = TL + WL(fo) \quad (12)$$

Where:

O' ⊆ 0 such that ∀ ô ∈ O' {station (ô ∈ f(s)}

D is the range of clays where f can be performed within O' k=round(date(o)−creation date(f)

cat=category of f{cat ∈ CAT}

In one embodiment, the step 110 also includes calculating total aggregate workload for new, or future non-routine items. In one embodiment, a future non-routine maintenance item or future FMR is a predicted maintenance item not associated with a recurrent repair interval. In one embodiment, calculating total aggregate workload for new non-routine items involves the system 10 referencing historical data and applying a probability distribution to propose an aggregate workload in the future. In one embodiment, the system 10 utilizes historical data that contains various types of non-routine items opened in the past to infer trends and plots accordingly in the future forecast. In one embodiment, the step of calculating total aggregate workload for new, or future non-routine items 110 includes the system 10 using the mixed-integer program as follows:

After initializing total new FMR workload ("WL"), calculate for all ∀a ∈ A, ∀d ∈ D, ∀o ∈ O:

$$WL(o) = P'(A_{CAT,k}) * \overline{WL}(CAT) \quad (13)$$

$$WL(d) = \Sigma WL(o) \quad (14)$$

$$WL(a) = WL(a) + WL(d) \quad (15)$$

$$WL = WL + WL(a) \quad (16)$$

Where:

D=[today, HORIZON] where HORIZON=max date in the future where forecasting stops; and $\overline{WL}$ (CAT)=average workload of all FMRs of category CAT by aircraft; computed from historical data;

In an exemplary embodiment, WL gives the total aggregate expected workload for new FMRs over D. In one embodiment, the step 110 also includes calculating the total FMR workload for a given day (d) using the following equation:

$$\sum_{i=1, j=1}^{i=n, j=m} WL(f_i; o_j) \qquad (17)$$

Before, during or after the step 100, the system 10 generates Green Tails at the step 115. In several embodiments, the system 10 provides a capability named "Green Tails" which constitutes a set of aircraft which are relatively free of "heavy" maintenance requirements in the next few days. In several embodiments, these Green Tails become good candidates for swaps as they place little requirements for maintenance until a few days later. In one embodiment, this is achieved by placing heavy workload on select aircraft each night so that they become "green" or relatively free of maintenance in the next few days. In one embodiment, the system 10 also imposes certain logic to ensure that not all aircraft every night are "heavy" and not all become "green" in the next few days. In several embodiments, this capability is expected to achieve and maintain routing accuracy. In several embodiments, Green Tails are generated in two ways—either as part of daily workload development in the step 120 or as an automated function in the step 125. In several embodiments, the automated function is automatically invoked when green tails that are generated as part of daily workload development do not meet the green tail requirements. In one embodiment, it can also be invoked at any time.

Figure 14A:
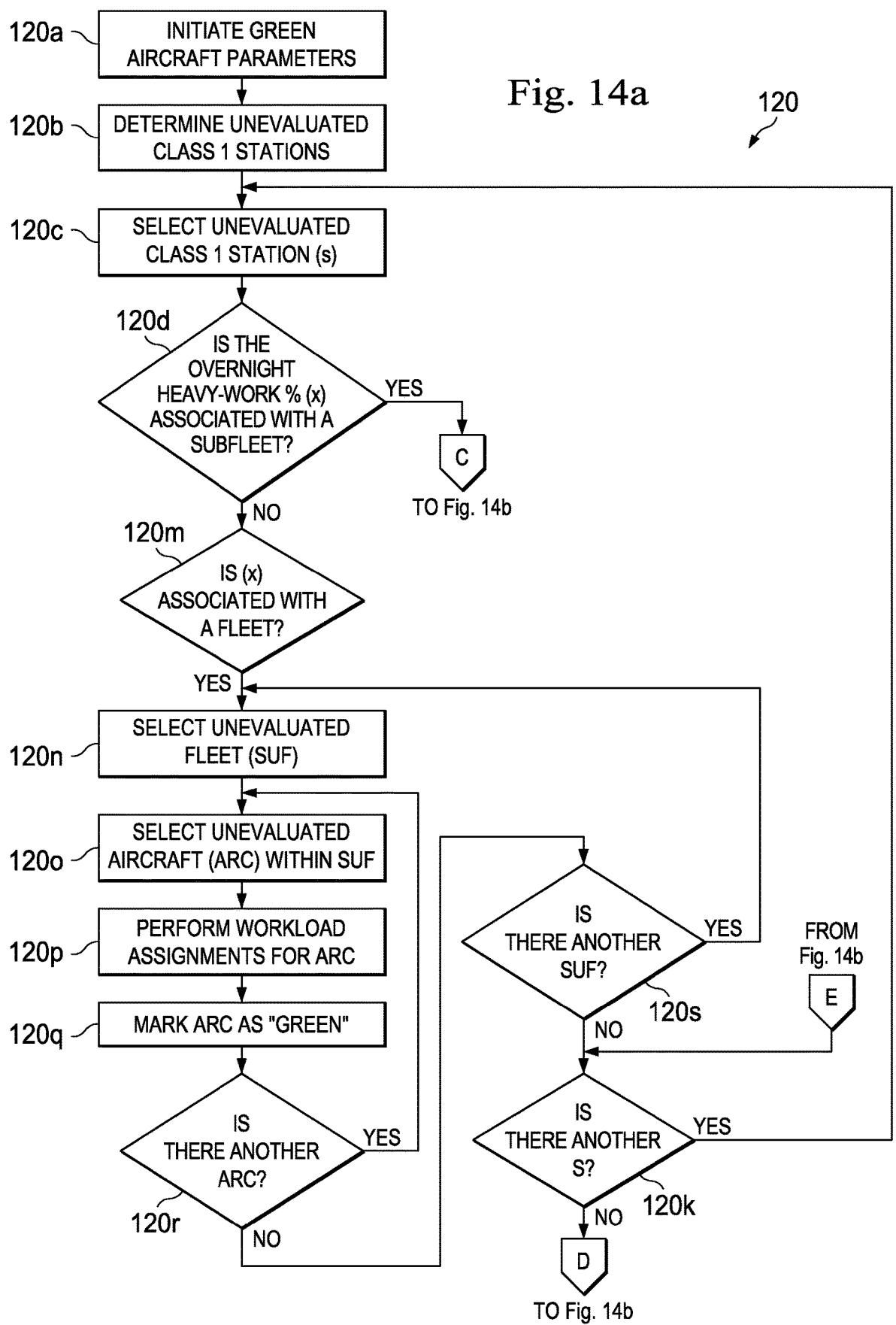
FIGS. 14a and 14b together form a flow chart illustration of a step of the method of FIG. 3, according to another exemplary embodiment.
Figure 14B:
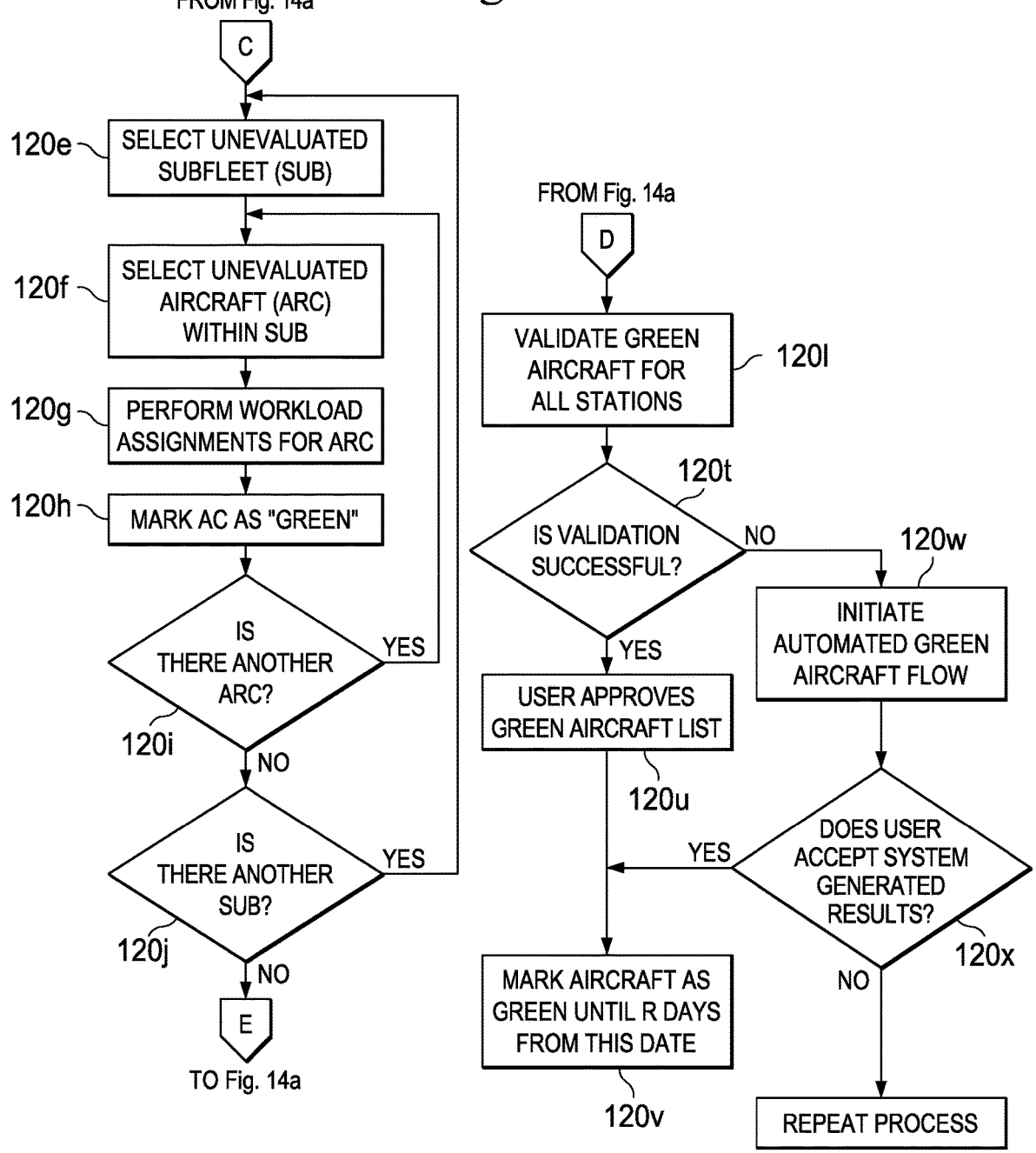

In an exemplary embodiment, as illustrated in FIGS. 14a and 14b, with continuing reference to FIGS. 1-3, generating Green Tails" as part of the daily workload development at the step 120 includes the system 10 initiating green aircraft parameters at step 120a. In one embodiment, the green aircraft parameters that are configurable are (x), which is the overnight heavy-work % by fleet or subfleet and (r), which is the green range that denotes the number of days an aircraft can remain green from the time of the heavy work, and is also associated with when the aircraft becomes eligible for heavy work once again. In one embodiment, the parameter (r) is by fleet and subfleet. Before, during or after the step 120a, the system 10 determines unevaluated class I stations at step 120b. In one embodiment, the system 10 determines unevaluated class 1 stations for each flight or subfleet for the given day at the step 120b. In one embodiment, the Class I stations are determined based on the current routing data. Before, during or after the step 120b, the system 10 selects an unevaluated class 1 station at step 120c. Before, during, or after the step 120c, the system 10 determines whether the overnight heavy-work % (x) is configured for the subfleet level at step 120d. If yes, then the system 10 selects an unevaluated subfleet (SUB) at step 120e. Before, during, or after the step 120e, the system 10 selects an unevaluated aircraft (ARC) within the SUB at step 120f. Before, during, or after the step 120f, the system 10 performs or creates workload assignments for ARC at step 120g. In one embodiment, the intent is to protect these aircraft as the "green" aircraft and the system 10 also checks for station capacity as assignments are made. Before, during, or after the step 120g, the system 10 marks the aircraft ARC as "green" after a sufficient number of assignments are made at step 120h. In an exemplary embodiment, a "sufficient number" is reached when no items become due until (r) days from the date of operation. Before, during, or after the step 120h, the system 10 determines whether there is another ARC at step 120i. That is, the system 10 determines whether an ARC exists that has not already been selected at step 120f. If yes, then the next step is the step 120f at which an unevaluated aircraft within SUB is selected. If no, then the system 10 determines whether there is another SUB at step 120j. That is, the system 10 determines whether a SUB exists that has not already been selected at the step 120e. If yes, then the next step is 120e. If no, then the system 10 determines whether there is another station at step 120k. If yes, then the next step is the step 120c. If no, then the next step is step 120l. Before, during, or after the step 120d and if the overnight heavy-work % (x) is not associated with a subfleet, then the system 10 determines whether the overnight heavy-work % (x) is associated with a fleet at step 120m. Before, during, or after the step 120m and if the overnight heavy-work % (x) is associated with a fleet, then the system 10 selects an unevaluated fleet SUF at step 120n. Before, during, or after the step 120n, the system 10 selects an unevaluated aircraft ARC within the SUF at step 120o. Before, during, or after the step 120o, the system 10 performs workload assignments for ARC at step 120p. Before, during, or after the step 120p, the system 10 marks ARC as "green" after a sufficient number of assignments are made at step 120q. In an exemplary embodiment, a "sufficient number" is reached when no items become due until (r) days from the date of operation. Before, during, or after the step 120q, the system 10 determines whether there is another ARC at step 120r. Before, during, or after the step 120r and if there is another AC, then the next step is step 120o. Before, during, or after the step 120r and if there is not another AC, then the system 10 determines whether there is another SUF at step 120s. Before, during, or after the step 120s and if there is another SUF, the next step is the step 120n. Before, during, or after the step 120s and if there is not another SUF, the next step is the step 120k at which the system 10 determines whether there is another station (s). Before, during, or after the step 120k and if there is another station, the system 10 selects an unevaluated station at the step 120b. Before, during, or after the step 120k and if there is not another station, the system 10 validates all green aircraft for all stations at the step 120l. In one embodiment, validation includes checking to see if all manpower has been consumed and at least one green aircraft has been selected at a station. Before, during, or after the step 120l, the system 10 determines if the validation was successful at step 120t. Before, during, or after the step 120t and if the validation is successful, the system 10 determines if the user approves the green aircraft list at step 120u. Before, during, or after the step 120u, the system 10 marks aircraft as green for (r) days at step 120v. Before, during, or after the step 120t and if the validation was not successful, the system 10 initiates automated green aircraft flow, which is described in the step 125, at step 120w. Before, during, or after the step 120w, the system 10 determines whether the user accepts the system generated results at step 120x. Before, during, or after the step 120x and if the user accepts the system generated results, then the next step is the step 120v at which the system 10 marks aircraft as "green" for (r) days. Before, during, or after the step 120x and if the user does not accept the system generated results, then the next step is the step 120a and the process is repeated.

Figure 15:
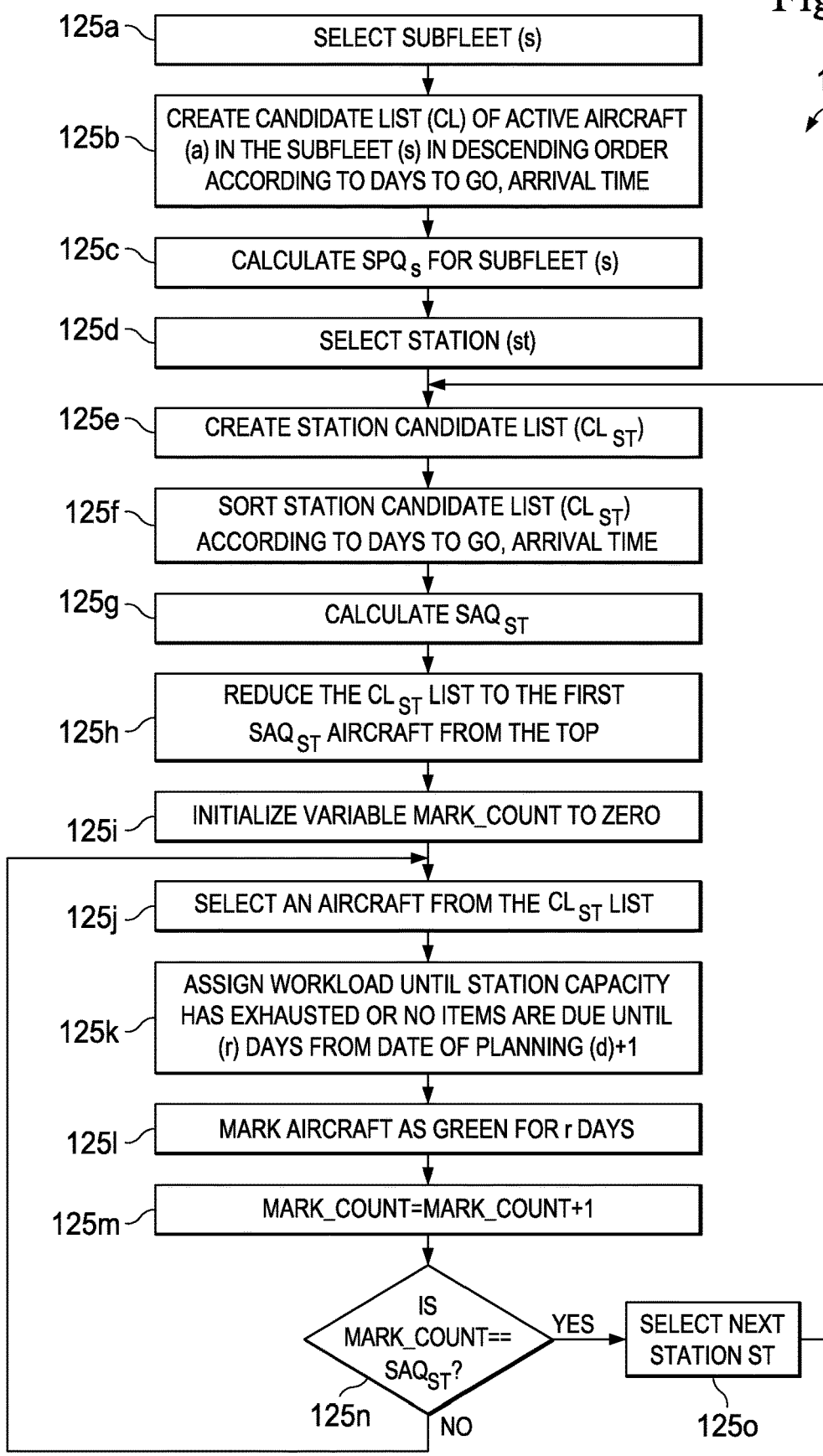
FIG. 15 is a flow chart illustration of a step of the method of FIG. 3, according to another exemplary embodiment.

In an exemplary embodiment, as illustrated in FIG. 15 with continuing reference to FIGS. 1-3, generating "green tails" as an automated function at the step 125 includes the system 10 selecting a subfleet (s) at step 125a. Before, during or after the step 125a, the system 10 creates a Candidate List (CL) of active aircraft (a) in the subfleet (s) at step 125b. In one embodiment, the Candidate List (CL) is sorted in descending order according to Days to Go (DTG) and arrival time. Before, during or after the step 125b, the system 10 calculates Station Planned Quantity (SPQ$_s$) for the subfleet (s) at step 125c. In one embodiment, a mixed integer program is used to calculate the (SPQ$_s$) for the subfleet (s). In one embodiment, parameters used by the mixed-integer program can be described as follows:

p is the planned percentage of green aircraft for a given subfleet.

d is the date of planning.

r is the green range and denotes the number of days an aircraft can remain green from the time of the heavy work; also indicates when this aircraft becomes eligible for heavy work once again.

A'$_s$ is the set of active aircraft in s; A'$_s$ ∈ A.

CL$_s$ is a candidate list of active aircraft for s sorted by DTG in ascending order so that aircraft with least amount of DTG appear at the top.

TA$_{st}$ is the set of terminating aircraft at st on d; TA$_{st}$ ⊆ A'$_s$.

S is a set of subfleets; s ∈ S.

In one embodiment, the mixed integer programs used to calculate the SPQ$_s$ for the subfleet (s) can be mathematically written as follows:

Calculate:

$$SPQ_s = \max\left(1, \text{ceiling}\left(\frac{p * |CL_s|}{|S|}\right)\right); \forall st \in ST \quad (18)$$

Before, during or after the step 125c, the system 10 selects station (st) from the plurality of stations at step 125d. Before, during or after the step 125d, the system 10 creates a Station Candidate List (CL$_{st}$) at step 125e. In one embodiment, a mixed integer program is used to calculate the Station Candidate List (CL$_{st}$). In one embodiment, the mixed integer programs used to calculate the CL$_{st}$ can be mathematically written as follows:

Calculate:

$$CL_{st} = CL \cap TA_{st}\{CL_{st} \subseteq A'_s\} \quad (19)$$

Before, during or after the step 125e, the system 10 sorts the station candidate list CL$_{st}$ in descending order according to Days to Go (DTG) and arrival time at step 125f. Before, during or after the step 125f, the system 10 calculates SAQ$_{st}$ at step 125g. In one embodiment, the SAQ$_{ST}$ is the Station Available Quantity. In one embodiment, a mixed integer program is used to calculate the SAQ$_{st}$. In one embodiment, the mixed integer programs used to calculate the SAQ$_{st}$ can be mathematically written as follows:

Calculate:

$$SAQ_{st} = \min(|SPQ_s|, |CL_{st}|) \quad (20)$$

Before, during or after the step 125g, the system 10 reduces the CL$_{st}$ to the first |SAQ$_{st}$| aircraft from the top of the list at step 125h. Before, during or after the step 125h, the system 10 initializes a variable "Mark_count" to zero at step 125i. Before, during or after the step 125i, the system 10 selects an aircraft (a) from the Station Candidate List (CL$_{st}$) at step 125j. Before, during or after the step 125j, the system 10 assigns workload until station capacity has been exhausted or no items are due until (r) days from date of planning (d)+1 at step 125k. In one embodiment and when the recurrent repair interval or the flight allowance is associated with the units of hours or calendar days, items are due when maintenance items associated with the recurrent repair interval or the flight allowance are required to be completed. Before, during or after the step 125k, the system 10 marks the aircraft (a) "green" for (r) number of days at step 125l. Before, during or after the step 125l, the system 10 increments the mark count by 1 using mark_count=mark_count+1 at step 125m. Before, during or after the step 125m, the system 10 determines if mark_count is equal to SAQ$_{st}$, which is the number of aircraft (a) at station (st) that should be designated or marked green at step 125n. Before, during or after the step 125n and if mark_count is equal to SAQ$_{st}$, then the system 10 selects the next station (st) at step 125o. The next step is the step 125e, at which the system 10 repeats the steps 125e-125n for the next station (st). Before, during or after the step 125n and if mark_count is not equal to SAQ$_{st}$, then the system 10 selects an aircraft from the CL$_{st}$ at the step 125j. This allows the system 10 to repeat the steps 125j-125n until the number of aircraft marked as green equals to the SAQ$_{st}$.

Figure 16:
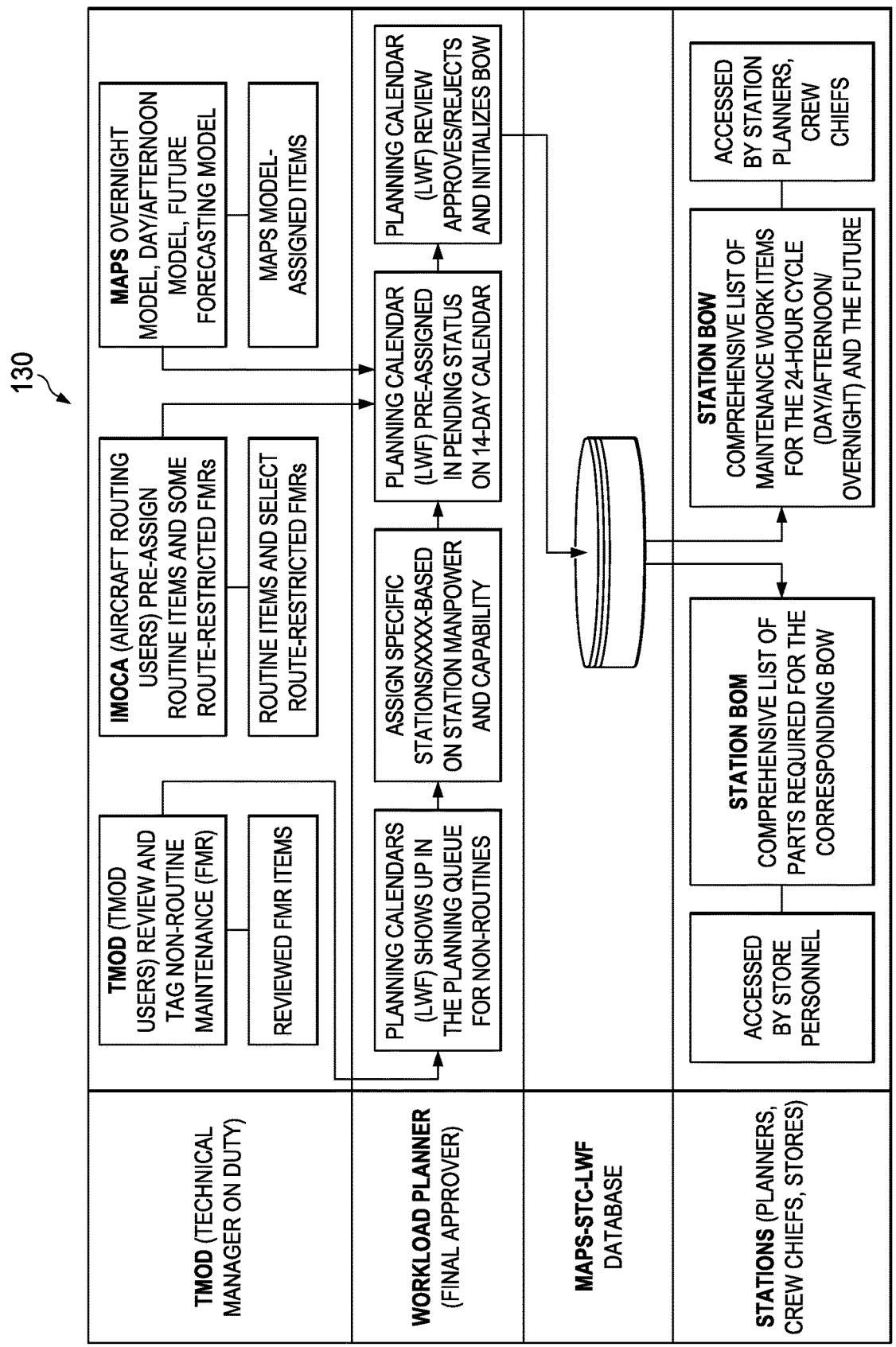
FIG. 16 is a flow chart illustration of the system of FIG. 1, according to another exemplary embodiment.

In an exemplary embodiment, with continuing reference to FIGS. 1-2, an alternative method 130 of operating the system 10 is depicted in FIG. 16.

In several embodiments, the system 10 integrates data with a suite of applications used by flight operations control. In one embodiment, the data is integrated so that those users have full visibility into the maintenance requirements placed on each aircraft for the current day as well as the future. In several embodiments, this would allow the users to make better decisions in regards to aircraft swapping during OSO events, flight cancellations, delays or crew unavailability. For example, the green tails mentioned above would appear to them as potential swap candidates when they attempt to swap an aircraft with preassigned maintenance items on it.

In several embodiments, use of the system 10 or completion of at least a part of the method 70 allows the anticipation and management of upcoming maintenance, thereby reducing the number of out-of-service aircraft, deferred maintenance items, and cancelled or delayed flights due to unplanned maintenance events. In several embodiments, use of the system 10 or completion of at least a part of the method 70 allows for parts associated with maintenance items to be ordered in advance, to avoid priority-shipping or other shipping costs. In several embodiments, the use of the system 10 or completion of at least a part of the method 70 reduces operating costs and increases revenue.

In several embodiments, use of the system 10 or completion of at least a portion of the method 70 allows for visibility into the future maintenance landscape, which allows the planner to proactively distribute workload across various stations so that no station is underperforming or overburdened on any given date. In several embodiments, this amounts to a kind of "insurance policy" against unanticipated events which disrupt an otherwise solid maintenance plan. In several embodiments, this allows for a more evenly distributed maintenance workload across stations and helps reduce "peaks" and "valleys," which correspond to the scenarios where certain stations are overloaded on certain dates due to various reasons (e.g. high number of sick calls by personnel or out-of-service aircraft) while others have a relative lull.

In one embodiment, the use of the system 10 or completion of at least a portion of the method 70 results in a corresponding parts list (commonly referred to as the Bill-Of-Material) getting created and made available. In several embodiments, this allows store personnel to proactively plan for required inventory and start ordering and shipping of those parts in advance, thus greatly reducing the need to do expedited and more expensive shipping done on the day of the actual scheduled work.

In several embodiments, any step within the method 70 may be omitted.

Figure 17:
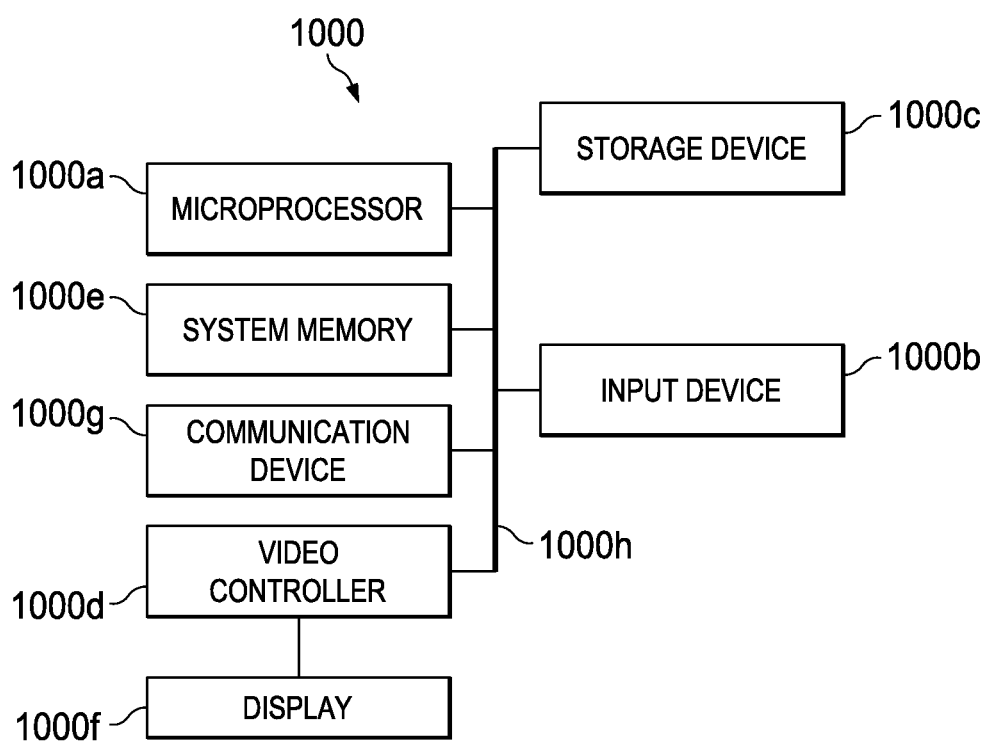
FIG. 17 is a diagrammatic illustration of a computing device for implementing one or more exemplary embodiments of the present disclosure, according to an exemplary embodiment.

In an exemplary embodiment, as illustrated in FIG. 17 with continuing reference to FIGS. 1-16, an illustrative computing device 1000 for implementing one or more embodiments of one or more of the above-described networks, elements, methods and/or steps, and/or any combination thereof, is depicted. The computing device 1000 includes a processor 1000a, an input device 1000b, a storage device 1000c, a video controller 1000d, a system memory 1000e, a display 1000f, and a communication device 1000g, all of which are interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer readable medium that may contain executable instructions. In several exemplary embodiments, the communication device 1000g may include a modem, network card, or any other device to enable the computing device 1000 to communicate with other computing devices. In several exemplary embodiments, any computing device represents a plurality of interconnected (whether by intranet or Internet) computer systems, including without limitation, personal computers, mainframes, PDAs, smartphones and cell phones.

In several exemplary embodiments, one or more of the functional module 14, the computer processor 15, the computer readable medium 20, the database 25, the remote user device 30, and/or one or more components thereof, are, or at least include, the computing device 1000 and/or components thereof, and/or one or more computing devices that are substantially similar to the computing device 1000 and/or components thereof. In several exemplary embodiments, one or more of the above-described components of one or more of the computing device 1000, the functional module 14, the computer processor 15, the computer readable medium 20, the database 25, and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 35, and/or one or more portions thereof, may be designed to work on any specific architecture. In an exemplary embodiment, one or more portions of the network 35 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a computer program, such as a plurality of instructions stored on a computer readable medium, such as the computer readable medium 20, the system memory 1000e, and/or any combination thereof, may be executed by a processor to cause the processor to carry out or implement in whole or in part the operation of the system 10, one or more of the method 60, and/or any combination thereof. In several exemplary embodiments, such a processor may include one or more of the computer processor 15, the processor 1000a, and/or any combination thereof. In several exemplary embodiments, such a processor may execute the plurality of instructions in connection with a virtual computer system.

A method has been described that includes receiving, using at least one computer, data associated with a transportation system, the transportation system including a plurality of vehicles each of which is parked at, or is expected to be parked at, two or more maintenance stations, the two or more maintenance stations being at least a part of a plurality of maintenance stations; wherein the data associated with the transportation system includes maintenance data associated with maintenance items associated with the plurality of vehicles; raw manpower data associated with total manpower available to complete all the maintenance items; and raw routing data associated with movement of at least one vehicle from the plurality of vehicles between the two or more maintenance stations; and generating, using the at least one computer, the maintenance data, the raw manpower data, and the raw routing data, a workload assignment for at least one maintenance station from the plurality of maintenance stations, the workload assignment for the at least one maintenance station reflecting a plurality of maintenance items to be completed at the at least one maintenance station; wherein the workload assignment includes routine maintenance items, wherein each routine maintenance item is an existing maintenance item having a recurrent repair interval associated with an interval of time in which the maintenance item should be completed; open non-routine maintenance items, wherein each open non-routine maintenance item is an existing maintenance item having a flight allowance associated with an amount of time in which the maintenance item should be completed and wherein each open non-routine maintenance item is not associated with a recurrent repair interval; and future non-routine maintenance items, wherein each future non-routine maintenance item is a predicted maintenance item not associated with a recurrent repair interval. In an exemplary embodiment, the data associated with the transportation system further includes historical data associated with at least one of: historical raw manpower data, historical maintenance data, historical raw routing data, and a historical workload assignment; wherein the method further includes generating, using the at least one computer, the maintenance data, the routing data, and the historical data, an artificial routing for a subset of vehicles from the plurality of vehicles, the artificial routing including a next maintenance date, a virtual maintenance station, a total ship time associated with the subset of vehicles and also associated with the next maintenance date, and a total ship cycle associated with the subset of vehicles and also associated with the next maintenance date; and wherein generating the artificial routing includes calculating a next opportunity using an average maintenance opportunity interval derived from the historical data; calculating the next maintenance date using the next opportunity and a last maintenance date derived from the historical data; calculating the total ship time using a last total ship time derived from the historical data, the next opportunity, and an average flying hours unit derived from the historical data; calculating the total ship cycles using a last total ship cycle derived from the historical data, the next opportunity, and an average flying cycles unit derived from the historical data; and associating the virtual maintenance station with the next maintenance date, the total ship time, and the total ship cycles. In an exemplary embodiment, the workload assignment assigns the first plurality of maintenance items associated with a subset of vehicles from the plurality of vehicles, the first plurality of maintenance items to be completed within a first period of time; wherein each of the maintenance items within the first plurality of maintenance items is associated with one of a repair interval or a flight allowance, the one of a repair interval or flight allowance requiring each of the maintenance items to be completed within a second period of time that is longer than the first period of time; wherein a green period equals the difference between the second and the first periods of time; and wherein each of the vehicles within the subset of vehicles can depart from the at least one maintenance station during the green period. In an exemplary embodiment, the method includes determining, using the at least one computer, available manpower at the at least one maintenance station, including identifying a plurality of shifts that extend over a specific period of time; identifying a sub-location associated with each shift from the plurality of shifts; identifying an amount of personnel associated with each shift from the plurality of shifts and associated with the sub-location; identifying deductions associated with each shift from the plurality of shifts; and calculating available manpower associated with each shift using the sub-location, the amount of personnel, and the deductions associated with each shift; and determining, using the at least one computer, a maintenance opportunity associated with an amount of ground time sufficient in duration for a maintenance item to be completed, including identifying, using the raw routing data, a turn that is associated with a ground time for a first vehicle, the ground time being associated with an amount of time between an arrival time of the first vehicle at the at least one maintenance station and the departure time of the first vehicle from the at least one maintenance station; and designating the turn, based on the duration of the ground time and on the arrival time of the first vehicle, as a turnaround or a termination. In an exemplary embodiment, generating the workload assignment includes identifying, using the at least one computer, a first routine maintenance item associated with the first vehicle, the first vehicle having a total ship time associated with a period of time calculated from the most recent completion of a routine maintenance item that is the same as, or equivalent to, the first routine maintenance item; determining, using the at least one computer, whether the total ship time exceeds a repair interval associated with the first maintenance item; if the total ship time exceeds the repair interval, then assigning the first routine maintenance item to at least one of: a current maintenance opportunity, a previous maintenance opportunity, and a virtual maintenance opportunity; wherein the previous maintenance opportunity is a routine maintenance opportunity that occurs before the current maintenance opportunity and the virtual maintenance opportunity is a routine maintenance opportunity that occurs before the current maintenance opportunity and after the previous maintenance opportunity; and if the total ship time does not exceed the repair interval, then assigning the first routine maintenance item to the current opportunity if the total ship time is greater than or equal to at least one of: a yield threshold, a bill-of-work threshold, a subsumed threshold, and a blocked threshold; wherein the yield threshold is a threshold in which the routine maintenance item should be completed, the bill-of-work threshold is a threshold in which the routine maintenance item should be assigned, the subsumed threshold is a threshold in which a subsuming maintenance item should be assigned, and a blocked threshold is a threshold in which a blocking maintenance item should be assigned. In an exemplary embodiment, generating the workload assignment includes identifying, using the at least one computer, one of the open non-routine maintenance item associated with a first vehicle, the one open non-routine first maintenance item associated with a high priority status or a low priority status; determining, using the at least one computer, whether the one open non-routine maintenance item is associated with the high priority status or the low priority status; if the one open non-routine maintenance item is associated with the high priority status, then either: assigning the one open non-routine maintenance item to a current maintenance opportunity if there is a subsuming maintenance item associated with the current maintenance opportunity; or assigning the one open non-routine maintenance item to a future opportunity if a subsuming maintenance item is associated with the future opportunity; wherein each of the subsuming maintenance items requires completion of either a subsumed maintenance item associated with the current maintenance opportunity or a subsumed maintenance item associated with the future opportunity; and wherein the current opportunity occurs before the future opportunity; and if the one open non-routine maintenance item is associated with the low priority status, then either: assigning the one open non-routine maintenance item to the current maintenance opportunity if the subsumed maintenance item associated with the current maintenance opportunity exists; or assigning the one open non-routine maintenance item to the future opportunity if the subsumed maintenance item associated with the future opportunity exists. In an exemplary embodiment, the method includes calculating a workload for the one open non-routine maintenance item using an amount of manhours required to complete the one open non-routine maintenance item and a probability of the one open non-routine maintenance item being completed. In an exemplary embodiment, the method includes generating, using the at least one computer, a bill of materials for the least one maintenance station, the bill of materials including parts associated with the completion of the plurality of maintenance items assigned to the at least one maintenance station.

An apparatus has been described that includes a non-transitory computer readable medium; and a plurality of instructions stored on the non-transitory computer readable medium and executable by one or more processors, the plurality of instructions including instructions that cause the one or more processors to receive data associated with a transportation system, the transportation system including a plurality of vehicles each of which is parked at, or is expected to be parked at, two or more maintenance stations, the two or more maintenance stations being at least a part of a plurality of maintenance stations; wherein the data associated with the transportation system includes maintenance data associated with maintenance items associated with the plurality of vehicles; raw manpower data associated with total manpower available to complete all the maintenance items; and raw routing data associated with movement of at least one vehicle from the plurality of vehicles between the two or more maintenance stations; and instructions that cause the one or more processors to generate, using the maintenance data, the raw manpower data, and the raw routing data, a workload assignment for at least one maintenance station from the plurality of maintenance stations, the workload assignment for the at least one maintenance station reflecting a plurality of maintenance items to be completed at the at least one maintenance station; wherein the workload assignment includes routine maintenance items, wherein each routine maintenance item is an existing maintenance item having a recurrent repair interval associated with an interval of time in which the maintenance item should be completed; open non-routine maintenance items, wherein each open non-routine maintenance item is an existing maintenance item having a flight allowance associated with an amount of time in which the maintenance item should be completed and wherein each open non-routine maintenance item is not associated with a recurrent repair interval; and future non-routine maintenance items, wherein each future non-routine maintenance item is a predicted maintenance item not associated with a recurrent repair interval. In an exemplary embodiment, wherein the workload assignment assigns the first plurality of maintenance items associated with a subset of vehicles from the plurality of vehicles, the first plurality of maintenance items to be completed within a first period of time; wherein each of the maintenance items within the first plurality of maintenance items is associated with one of a repair interval or a flight allowance, the one of a repair interval or a flight allowance requiring each of the maintenance items to be completed within a second period of time that is longer than the first period of time; wherein a green period equals the difference between the second and the first periods of time; and wherein each of the vehicles within the subset of vehicles can depart from the at least one maintenance station during the green period. In an exemplary embodiment, the data associated with the transportation system further includes historical data associated with at least one of: historical raw manpower data, historical maintenance data, historical raw routing data, and a historical workload assignment; wherein the plurality of instructions further includes instructions that cause the one or more processors to generate, using the maintenance data, the routing data, and the historical data, an artificial routing for a subset of vehicles from the plurality of vehicles, the artificial routing including a next maintenance date, a virtual maintenance station, a total ship time associated with the subset of vehicles and also associated with the next maintenance date, and a total ship cycle associated with the subset of vehicles and also associated with the next maintenance date; and wherein the instructions that cause the one or more processors to generate the artificial routing include instructions that cause the one or more processors to calculate a next opportunity using an average maintenance opportunity interval derived from the historical data; instructions that cause the one or more processors to calculate the next maintenance date using the next opportunity and a last maintenance date derived from the historical data; instructions that cause the one or more processors to calculate the total ship time using a last total ship time derived from the historical data, the next opportunity, and an average flying hours unit derived from the historical data; instructions that cause the one or more processors to calculate the total ship cycles using a last total ship cycle derived from the historical data, the next opportunity, and an average flying cycles unit derived from the historical data; and instructions that cause the one or more processors to associate the virtual maintenance station with the next maintenance date, the total ship time, and the total ship cycles. In an exemplary embodiment, the plurality of instructions further includes instructions that cause the one or more processors to determine available manpower at the at least one maintenance station, including instructions that cause the one or more processors to identify a plurality of shifts that extend over a specific period of time; instructions that cause the one or more processors to identify a sub-location associated with each shift from the plurality of shifts; instructions that cause the one or more processors to identify an amount of personnel associated with each shift from the plurality of shifts and associated with the sub-location; instructions that cause the one or more processors to identify deductions associated with each shift from the plurality of shifts; and instructions that cause the one or more processors to calculate available manpower associated with each shift using the sub-location, the amount of personnel, and the deductions associated with each shift; and instructions that cause the one or more processors to determine a maintenance opportunity associated with an amount of ground time sufficient in duration for a maintenance item to be completed, including instructions that cause the one or more processors to identify, using the raw routing data, a turn that is associated with a ground time for a first vehicle, the ground time being associated with an amount of time between an arrival time of the first vehicle at the at least one maintenance station and the departure time of the first vehicle from the at least one maintenance station; and instructions that cause the one or more processors to designate the turn, based on the duration of the ground time and on the arrival time of the first vehicle, as a turnaround or a termination. In an exemplary embodiment, the instructions that cause the one or more processors to generate the workload assignment include instructions that cause the one or more processors to identify a first routine maintenance item associated with the first vehicle, the first vehicle having a total ship time associated with a period of time calculated from the most recent completion of a routine maintenance item that is the same as, or equivalent to, the first routine maintenance item; instructions that cause the one or more processors to determine whether the total ship time exceeds a repair interval associated with the first maintenance item; instructions that, if the total ship time exceeds the repair interval, cause the one or more processors to assign the first routine maintenance item to at least one of: a current maintenance opportunity, a previous maintenance opportunity, and a virtual maintenance opportunity; wherein the previous maintenance opportunity is a routine maintenance opportunity that occurs before the current maintenance opportunity and the virtual maintenance opportunity is a routine maintenance opportunity that occurs before the current maintenance opportunity and after the previous maintenance opportunity; and instructions that, if the total ship time does not exceed the repair interval, cause the one or more processors to assign the first routine maintenance item to the current opportunity if the total ship time is greater than or equal to at least one of: a yield threshold, a bill-of-work threshold, a subsumed threshold, and a blocked threshold; wherein the yield threshold is a threshold in which the routine maintenance item should be completed, the bill-of-work threshold is a threshold in which the routine maintenance item should be assigned, the subsumed threshold is a threshold in which a subsuming maintenance item should be assigned, and a blocked threshold is a threshold in which a blocking maintenance item should be assigned. In an exemplary embodiment, the instructions that cause the one or more processors to generate the workload assignment include instructions that cause the one or more processors to identify one of the open non-routine maintenance items associated with a first vehicle, the one open non-routine first maintenance item associated with a high priority status or a low priority status; instructions that cause the one or more processors to determine whether the one open non-routine maintenance item is associated with the high priority status or the low priority status; instructions that, if the one open non-routine maintenance item is associated with the high priority status, cause the one or more processors to either: assign the one open non-routine maintenance item to a current maintenance opportunity if there is a subsuming maintenance item associated with the current maintenance opportunity; or assign the one open non-routine maintenance item to a future opportunity if a subsuming maintenance item is associated with the future opportunity; wherein each of the subsuming maintenance items requires completion of either a subsumed maintenance item associated with the current maintenance opportunity or a subsumed maintenance item associated with the future opportunity; and wherein the current opportunity occurs before the future opportunity; and instructions that, if the one open non-routine maintenance item is associated with the low priority status, cause the one or more processors to either: assign the one open non-routine maintenance item to the current maintenance opportunity if the subsumed maintenance item associated with the current maintenance opportunity exists; or assign the one open non-routine maintenance item to the future opportunity if the subsumed maintenance item associated with the future opportunity exists. In an exemplary embodiment, the plurality of instructions further includes instructions that cause the one or more processors to calculate a workload for the one open non-routine maintenance item using an amount of manhours required to complete the one open non-routine maintenance item and a probability of the one open non-routine maintenance item being completed. In an exemplary embodiment, the plurality of instructions further includes instructions that cause the one or more processors to generate a bill of materials for the least one maintenance station, the bill of materials including parts associated with the completion of the plurality of maintenance items assigned to the at least one maintenance station.

A method has been described that includes receiving, using at least one computer, data associated with a transportation system, the transportation system including a plurality of vehicles each of which is parked at, or is expected to be parked at, two or more maintenance stations, the two or more maintenance stations being at least a part of a plurality of maintenance stations; wherein the data associated with the transportation system includes maintenance data associated with maintenance items associated with the plurality of vehicles; raw manpower data associated with manpower available to complete the maintenance items; and raw routing data associated with movement of at least one vehicle from the plurality of vehicles between the two or more maintenance stations; and generating, using the at least one computer, the maintenance data, the raw manpower data, and the raw routing data, a workload assignment for at least one maintenance station from the plurality of maintenance stations, the workload assignment for the at least one maintenance station reflecting a first plurality of maintenance items to be completed at the at least one maintenance station; wherein the workload assignment assigns the first plurality of maintenance items associated with a subset of vehicles from the plurality of vehicles, the first plurality of maintenance items to be completed within a first period of time; wherein each of the maintenance items within the first plurality of maintenance items is associated with a repair deadline requiring each of the maintenance items to be completed within a second period of time that is longer than the first period of time, the repair deadline being an amount of time in which its associated maintenance item should be completed; wherein a green period equals the difference between the second and the first periods of time; and wherein each of the vehicles within the subset of vehicles can depart from the at least one maintenance station during the green period. In an exemplary embodiment, generating the workload assignment includes calculating, using the at least one computer, a candidate list of all vehicles parked at the at least one maintenance station within the first time period; sorting, using the at least one computer, the candidate list of all vehicles by an arrival time associated with the arrival of each vehicle within the candidate list to the at least one maintenance station; and selecting, using the at least one computer and based on the arrival time of each vehicle, a number of vehicles from the candidate list to form the subset of vehicles. In an exemplary embodiment, generating the workload assignment includes calculating, using the at least one computer, a candidate list of all vehicles parked at the at least one maintenance station within the first time period; sorting, using the at least one computer, the candidate list of all vehicles by the repair deadline associated with each vehicle within the candidate list; and selecting, using the at least one computer and based on the repair deadline of each vehicle, a number of vehicles from the candidate list to form the subset of vehicles.

An apparatus has been described that includes a non-transitory computer readable medium; and a plurality of instructions stored on the non-transitory computer readable medium and executable by one or more processors, the plurality of instructions including instructions that cause the one or more processors to receive data associated with a transportation system, the transportation system including a plurality of vehicles each of which is parked at, or is expected to be parked at, two or more maintenance stations, the two or more maintenance stations being at least a part of a plurality of maintenance stations; wherein the data associated with the transportation system includes maintenance data associated with maintenance items associated with the plurality of vehicles; raw manpower data associated with manpower available to complete the maintenance items; and raw routing data associated with movement of at least one vehicle from the plurality of vehicles between the two or more maintenance stations; and instructions that cause the one or more processors to generate, using the maintenance data, the raw manpower data, and the raw routing data, a workload assignment for at least one maintenance station from the plurality of maintenance stations, the workload assignment for the at least one maintenance station reflecting a first plurality of maintenance items to be completed at the at least one maintenance station; wherein the workload assignment assigns the first plurality of maintenance items associated with a subset of vehicles from the plurality of vehicles, the first plurality of maintenance items to be completed within a first period of time; wherein each of the maintenance items within the first plurality of maintenance items is associated with a repair deadline requiring each of the maintenance items to be completed within a second period of time that is longer than the first period of time, the repair deadline being an amount of time in which its associated maintenance item should be completed; wherein a green period equals the difference between the second and the first periods of time; and wherein each of the vehicles within the subset of vehicles can depart from the at least one maintenance station during the green period. In an exemplary embodiment, the instructions that cause the one or more processors to generate the workload assignment include instructions that cause the one or more processors to calculate a candidate list of all vehicles parked at the at least one maintenance station within the first time period; instructions that cause the one or more processors to sort the candidate list of all vehicles by an arrival time associated with the arrival of each vehicle within the candidate list to the at least one maintenance station; and instructions that cause the one or more processors to select, based on the arrival time of each vehicle, a number of vehicles from the candidate list to form the subset of vehicles. In an exemplary embodiment, the instructions that cause the one or more processors to generate the workload assignment include instructions that cause the one or more processors to calculate a candidate list of all vehicles parked at the at least one maintenance station within the first time period; instructions that cause the one or more processors to sort the candidate list of all vehicles by a repair interval associated with each vehicle within the candidate list; and instructions that cause the one or more processors to select, based on the repair interval of each vehicle, a number of vehicles from the candidate list to form the subset of vehicles.

It is understood that variations may be made in the foregoing without departing from the scope of the disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping transaction before, during or after which a ship travels from one port to another port and, in some case, on to one or more other ports. In an exemplary embodiment, aspects of the present disclosure are readily applicable and/or readily adaptable to a trucking transaction before, during or after which a truck travels from one location to another location and, in some case, on to one or more other locations. In an exemplary embodiment, aspects of the present disclosure are readily applicable and/or readily adaptable to a rail transaction before, during or after which a train travels from one city or station to another city or station and, in some cases, on to one or more other cities or stations. In an exemplary embodiment, aspects of the present disclosure are applicable and/or readily adaptable to a wide variety of transportation transactions such as, for example, an airline sequence, a leg of an airline sequence, an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method of repairing aircraft vehicles associated with a transportation system, the method comprising:

receiving, using at least one computer, data associated with the transportation system, the transportation system comprising a plurality of aircraft vehicles each of which is parked at, or is expected to be parked at, two or more maintenance stations, the two or more maintenance stations being at least a part of a plurality of maintenance stations;

wherein the two or more maintenance stations comprise a first maintenance station and a second maintenance station;

wherein the at least one computer comprises a graphical display; and wherein receiving, using the at least one computer, the data associated with the transportation system comprises:

presenting, on the graphical display, a first grouping of aircraft selection parameters associated with a first aircraft fleet, wherein the first aircraft fleet is part of the plurality of aircraft vehicles, wherein the presentation of the first grouping of aircraft selection parameters includes a first window having a first scrollbar, and a first plurality of rows within the first window, each row in the first plurality of rows being associated with an aircraft vehicle that is part of the first aircraft fleet, each row in the first plurality of rows including an aircraft nose number selection parameter, and an identification details selection parameter, wherein the first scrollbar permits the scrolling of the first plurality of rows to enable selection of any row in the first plurality of rows;

presenting, on the graphical display, a second grouping of aircraft selection parameters associated with a second aircraft fleet, wherein the second aircraft fleet is part of the plurality of aircraft vehicles, wherein the presentation of the second grouping of aircraft selection parameters includes a second window having a second scrollbar, and a second plurality of rows within the second window, each row in the second plurality of rows being associated with an aircraft vehicle that is part of the second aircraft fleet, each row in the second plurality of rows including an aircraft nose number selection parameter, and an identification details selection parameter, wherein the second scrollbar permits the scrolling of the second plurality of rows to enable selection of any row in the second plurality of rows;

receiving, using the at least one computer, maintenance data associated with maintenance items associated with the plurality of aircraft vehicles, comprising:

receiving, using the at least one computer, a selection of one row in the first plurality of rows;

in response to receiving the selection of the one row in the first plurality of rows, presenting a third window on the graphical display, the third window being associated with the aircraft that is part of the first aircraft fleet and associated with the selected one row in the first plurality of rows, the third window including therewithin:

a first selection box by which location data is indicated;

a first drop-down menu, a selection from which indicates a time period by which a first non-routine maintenance item must be completed;

a second selection box, a selection of which indicates that the first non-routine maintenance item is a fuel related item;

a third selection box, a selection of which indicates that the first non-routine maintenance item is associated with an overwater restriction;

a fourth selection box, a selection of which indicates that the first non-routine maintenance item is associated with a wide body domestic restriction;

a fifth selection box, a selection of which indicates either another restriction with which the first non-routine maintenance item is associated, or that the first non-routine maintenance item is another type of item;

a sixth selection box, a selection of which indicates that no indications are required with respect to the first non-routine maintenance item; and a first text box by which an estimated quantity of general manhours, which are required for the performance of the first non-routine maintenance item, are indicated;

a second text box by which an estimated quantity of avionics manhours, which are required for the performance of the first non-routine maintenance item, are indicated;

a third text box by which an estimated amount of time that the aircraft vehicle, which is part of the first aircraft fleet and associated with the selected one row in the first plurality of rows, is required to be on the ground for the first non-routine maintenance item to be performed excluding at least passenger loading/unloading and parking;

a first plurality of text boxes by which a time period, during which the first non-routine maintenance item is not to be assigned, is indicated; and a first button, the selection of which commands the at least one computer to validate a first record of the first non-routine maintenance item;

receiving, using the at least one computer, the selection of the first selection box indicating the location of the aircraft vehicle that is part of the first aircraft fleet and associated with the selected one row in the first plurality of rows;

receiving, using the at least one computer, the selection from the first drop-down menu indicating the time period by which the first non-routine maintenance item must be completed;
receiving, using the at least one computer, one or more of the following:
  the selection of the second selection box indicating that the first non-routine maintenance item is a fuel related item;
  the selection of the third selection box indicating that the first non-routine maintenance item is associated with an overwater restriction;
  the selection of the fourth selection box indicating that the first non-routine maintenance item is associated with a wide body domestic restriction;
  the selection of the fifth selection box indicating either the another restriction with which the first non-routine maintenance item is associated, or that the first non-routine maintenance item is the another type of item;
  the selection of the sixth selection box indicating that no indications are required with respect to the first non-routine maintenance item;
receiving, using the at least one computer, one or more of the following:
  via the first text box, the estimated quantity of general manhours required for the performance of the first non-routine maintenance item;
  via the second text box, the estimated quantity of avionics manhours required for the performance of the first non-routine maintenance item;
  via the third text box, the estimated amount of time that the aircraft vehicle, which is part of the first aircraft fleet and associated with the selected one row in the first plurality of rows, is required to be on the ground for the first non-routine maintenance item to be performed excluding at least passenger loading/unloading and parking;
validating, using the at least one computer, the first record of the first non-routine maintenance item, comprising:
  receiving, using the at least one computer, the selection of the first button commanding the at least one computer to validate the first record of the first non-routine maintenance item;
  confirming, using the at least one computer, the receipt of one or more of the respective selections of the second, third, fourth, fifth, and sixth selection boxes; and
  confirming, using the at least one computer, the receipt of one or more of the estimated quantity of general manhours required for the performance of the first non-routine maintenance item, the estimated quantity of avionics manhours required for the performance of the first non-routine maintenance item, and the estimated amount of time that the aircraft vehicle, which is part of the first aircraft fleet and associated with the selected one row in the first plurality of rows, is required to be on the ground for the first non-routine maintenance item to be performed excluding at least passenger loading/unloading and parking;

after validating the first record of the first non-routine maintenance item, saving, using the at least one computer, the validated first record of the first non-routine maintenance item;
receiving, using the at least one computer, a selection of one row in the second plurality of rows;
in response to receiving the selection of the one row in the second plurality of rows, presenting a fourth window on the graphical display, the fourth window being associated with the aircraft that is part of the second aircraft fleet and associated with the selected one row in the second plurality of rows, the fourth window including therewithin:
  a seventh selection box by which location data is indicated;
  a second drop-down menu, a selection from which indicates a time period by which a second non-routine maintenance item must be completed;
  an eighth selection box, a selection of which indicates that the second non-routine maintenance item is a fuel related item;
  a ninth selection box, a selection of which indicates that the second non-routine maintenance item is associated with an overwater restriction;
  a tenth selection box, a selection of which indicates that the second non-routine maintenance item is associated with a wide body domestic restriction;
  an eleventh selection box, a selection of which indicates either another restriction with which the second non-routine maintenance item is associated, or that the second non-routine maintenance item is another type of item;
  a twelfth selection box, a selection of which indicates that no indications are required with respect to the second non-routine maintenance item; and
  a fourth text box by which an estimated quantity of general manhours, which are required for the performance of the second non-routine maintenance item, are indicated;
  a fifth text box by which an estimated quantity of avionics manhours, which are required for the performance of the second non-routine maintenance item, are indicated;
  a sixth text box by which an estimated amount of time that the aircraft vehicle, which is part of the second aircraft fleet and associated with the selected one row in the second plurality of rows, is required to be on the ground for the second non-routine maintenance item to be performed excluding at least passenger loading/unloading and parking;
  a second plurality of text boxes by which a time period, during which the second non-routine maintenance item is not to be assigned, is indicated;
  a second button, the selection of which commands the at least one computer to validate a second record of the second non-routine maintenance item;
receiving, using the at least one computer, the selection of the seventh selection box indicating the location of the aircraft vehicle that is part of the second aircraft fleet and associated with the selected one row in the second plurality of rows;

receiving, using the at least one computer, the selection from the second drop-down menu indicating the time period by which the second non-routine maintenance item must be completed;

receiving, using the at least one computer, one or more of the following:
  the selection of the eighth selection box indicating that the second non-routine maintenance item is a fuel related item;
  the selection of the ninth selection box indicating that the second non-routine maintenance item is associated with an overwater restriction;
  the selection of the tenth selection box indicating that the second non-routine maintenance item is associated with a wide body domestic restriction;
  the selection of the eleventh selection box indicating either the another restriction with which the second non-routine maintenance item is associated, or that the second non-routine maintenance item is the another type of item;
  the selection of the twelfth selection box indicating that no indications are required with respect to the second non-routine maintenance item;

receiving, using the at least one computer, one or more of the following:
  via the fourth text box, the estimated quantity of general manhours required for the performance of the second non-routine maintenance item;
  via the fifth text box, the estimated quantity of avionics manhours required for the performance of the second non-routine maintenance item;
  via the sixth text box, the estimated amount of time that the aircraft vehicle, which is part of the second aircraft fleet and associated with the selected one row in the second plurality of rows, is required to be on the ground for the second non-routine maintenance item to be performed excluding at least passenger loading/unloading and parking;

validating, using the at least one computer, the second record of the second non-routine maintenance item, comprising:
  receiving, using the at least one computer, the selection of the second button commanding the at least one computer to validate the second record of the second non-routine maintenance item; and
  in response to receiving the selection of the second button:
    confirming, using the at least one computer, the receipt of one or more of the respective selections of the eighth, ninth, tenth, eleventh, and twelfth selection boxes; and
    confirming, using the at least one computer, the receipt of one or more of the estimated quantity of general manhours required for the performance of the second non-routine maintenance item, the estimated quantity of avionics manhours required for the performance of the second non-routine maintenance item, and the estimated amount of time that the aircraft vehicle, which is part of the second aircraft fleet and associated with the selected one row in the second plurality of rows, is required to be on the ground for the first non-routine maintenance item to be performed excluding at least passenger loading/unloading and parking;
  after validating the second record of the second non-routine maintenance item, saving, using the at least one computer, the validated second record of the second non-routine maintenance item;
  receiving, using the at least one computer, raw total manpower data associated with total manpower available to complete all the maintenance items;
  receiving, using the at least one computer, raw first station manpower data associated with manpower available at the first maintenance station;
  receiving, using the at least one computer, raw second station manpower data associated with manpower available at the second maintenance station; and
  receiving, using the at least one computer, raw routing data associated with a flight path of at least one aircraft vehicle from the plurality of aircraft vehicles, the flight path originating from a first location having the first maintenance station and ending at a second location having the second maintenance station;

forecasting, using the at least one computer, future non-routine maintenance items, wherein each forecasted future non-routine maintenance item is a predicted maintenance item not associated with a recurrent repair interval, wherein each forecasted future non-routine maintenance item is not an existing maintenance item;

calculating, using the at least one computer, a total aggregate workload for the forecasted future non-routine maintenance items using rules that define the total aggregate workload as a function of an historical, average workload related to non-routine maintenance items and an adjusted probability, wherein the adjusted probability is a probability of completing a non-routine maintenance item on a certain day;

generating, using the at least one computer, the maintenance data including the validated/saved first record of the first non-routine maintenance item and the validated/saved second record of the second non-routine maintenance item, the total raw manpower data, the raw first station manpower data, the raw second station manpower data, the raw routing data, and the total aggregate workload for the forecasted future non-routine maintenance items, a workload assignment for the first and the second maintenance stations, the workload assignment for the first and the second maintenance stations reflecting a plurality of maintenance items to be completed at the first and the second maintenance stations;

wherein the workload assignment comprises:
  routine maintenance items, wherein each routine maintenance item is an existing maintenance item having a recurrent repair interval associated with an interval of time in which the maintenance item should be completed; and
  open non-routine maintenance items, wherein each open non-routine maintenance item is an existing maintenance item having a flight allowance associated with an amount of time in which the maintenance item should be completed and wherein each open non-routine maintenance item is not associated with a recurrent repair interval;

wherein the workload assignment distributes the plurality of maintenance items to be completed at the first and second maintenance stations between the first and second maintenance stations based on the total raw manpower data, the raw first station manpower data, the raw second station manpower data, the raw routing data, and the total aggregate workload for the forecasted future non-routine maintenance items, to reduce maintenance costs associated with the transportation system;

wherein the workload assignment for the first maintenance station assigns a first plurality of maintenance items to be completed for a first subset of aircraft vehicles, each of which has an unrepaired state, from the plurality of aircraft vehicles so that no maintenance items are due for each aircraft in the first subset of aircraft vehicles for a predetermined number of days after the first plurality of maintenance items are completed;

wherein the workload assignment for the second maintenance station assigns a second plurality of maintenance items to be completed for a second subset of aircraft vehicles, each of which has an unrepaired state, from the plurality of aircraft vehicles so that no maintenance items are due for each aircraft in the second subset of aircraft vehicles for the predetermined number of days after the second plurality of maintenance items are completed;

routing the first subset of aircraft vehicles having unrepaired states to the first location having the first maintenance station;

performing the first plurality of maintenance items in accordance with the workload assignment at the first maintenance station to transform the state of each of the first subset of aircraft vehicles to a repaired state from its unrepaired state;

routing the second subset of aircraft vehicles having unrepaired states to the second location having the second maintenance station; and performing the second plurality of maintenance items in accordance with the workload assignment at the second maintenance station to transform the state of each of the second subset of aircraft vehicles to a repaired state from its unrepaired state.

2. The method of claim 1, wherein generating the workload assignment comprises:

identifying, using the at least one computer, one of the open non-routine maintenance items associated with a first aircraft vehicle, the one open non-routine first maintenance item being associated with a first priority status or a second priority status;

determining, using the at least one computer, whether the one open non-routine maintenance item is associated with the first priority status or the second priority status;

if the one open non-routine maintenance item is associated with the first priority status, then either:
  assigning the one open non-routine maintenance item to a current maintenance opportunity if there is a subsuming maintenance item associated with the current maintenance opportunity; or
  assigning the one open non-routine maintenance item to a future opportunity if a subsuming maintenance item is associated with the future opportunity;

wherein each of the subsuming maintenance items requires completion of either a subsumed maintenance item associated with the current maintenance opportunity or a subsumed maintenance item associated with the future opportunity; and wherein the current opportunity occurs before the future opportunity;

and if the one open non-routine maintenance item is associated with the second priority status, then either:
  assigning the one open non-routine maintenance item to the current maintenance opportunity if the subsumed maintenance item associated with the current maintenance opportunity exists; or
  assigning the one open non-routine maintenance item to the future opportunity if the subsumed maintenance item associated with the future opportunity exists;

wherein the first priority status has a higher priority status than the second priority status.

3. The method of claim 1, further comprising generating, using the at least one computer, a bill of materials for the first maintenance station, the bill of materials comprising parts associated with the completion of the plurality of maintenance items assigned to be completed at the first maintenance station.

4. A method of receiving requests for completion of maintenance items related to aircraft in an aircraft fleet, the method comprising:

presenting, using a functional module, a first window on a graphical user interface, the first window being associated with a selected aircraft that forms a portion of the aircraft fleet, the first window including therewithin:
  a first selection box by which location data is indicated;
  a first drop-down menu, a selection from which indicates a time period by which a first non-routine maintenance item must be completed;
  a first text box by which an estimated quantity of general manhours, which are required for the performance of the first non-routine maintenance item, are indicated;
  a second text box by which an estimated quantity of avionics manhours, which are required for the performance of the first non-routine maintenance item, are indicated;
  a third text box by which an estimated amount of time that the selected aircraft is required to be on the ground for the first non-routine maintenance item to be performed excluding at least passenger loading/unloading and parking, is indicated;
    wherein the estimated amount of time that the selected aircraft is required to be on the ground for the first non-routine maintenance item to be performed is the sum of the estimated quantity of general manhours and the estimated quantity of avionics manhours;
  a first plurality of text boxes by which a time period, during which the first non-routine maintenance item is not to be assigned, is indicated;
  a first button, the selection of which commands the functional module to validate a request for completion of a maintenance item;
  a second selection box, a selection of which indicates that the first non-routine maintenance item is a fuel related item;

a third selection box, a selection of which indicates that the first non-routine maintenance item is associated with an overwater restriction;

a fourth selection box, a selection of which indicates that the first non-routine maintenance item is associated with a wide body domestic restriction;

a fifth selection box, a selection of which indicates either another restriction with which the first non-routine maintenance item is associated, or that the first non-routine maintenance item is another type of item; and a sixth selection box, a selection of which indicates that no indications are required with respect to the first non-routine maintenance item; and receiving, using the graphical user interface and by the functional module, the request for completion of the maintenance item, comprising:

receiving the selection of the first selection box indicating the location of the selected aircraft;

receiving, using the graphical user interface and by the functional module, the selection from the first drop-down menu indicating the time period by which the first non-routine maintenance item must be completed;

receiving, using the graphical user interface and by the functional module, one or more of the following:

via the first text box, the estimated quantity of general manhours required for the performance of the first non-routine maintenance item;

via the second text box, the estimated quantity of avionics manhours required for the performance of the first non-routine maintenance item;

via the third text box, the estimated amount of time that the selected aircraft is required to be on the ground for the first non-routine maintenance item to be performed excluding at least passenger loading/unloading and parking; and receiving, using the graphical user interface and by the functional module, one or more of the following:

the selection of the second selection box indicating that the first non-routine maintenance item is a fuel related item;

the selection of the third selection box indicating that the first non-routine maintenance item is associated with an overwater restriction;

the selection of the fourth selection box indicating that the first non-routine maintenance item is associated with a wide body domestic restriction;

the selection of the fifth selection box indicating either the another restriction with which the first non-routine maintenance item is associated, or that the first non-routine maintenance item is the another type of item; and the selection of the sixth selection box indicating that no indications are required with respect to the first non-routine maintenance item;

validating, using the functional module, the request for completion of the maintenance item, comprising:

receiving, using the graphical user interface and by the functional module, the selection of the first button commanding the functional module to validate the request for completion of the maintenance item;

confirming, using the functional module, the receipt of one or more of the respective selections of the second, third, fourth, fifth, and sixth selection boxes;

confirming, using functional module, the receipt of one or more of the estimated quantity of general manhours required for the performance of the first non-routine maintenance item, the estimated quantity of avionics manhours required for the performance of the first non-routine maintenance item, and the estimated amount of time that the selected aircraft is required to be on the ground for the first non-routine maintenance item to be performed excluding at least passenger loading/unloading and parking; and after validating the request for completion of the maintenance item, saving, using the functional module, the validated request for completion of the maintenance item;

wherein the validated request for completion of the maintenance item is one of a plurality of validated requests for completion of maintenance items;

accessing, using the functional module, routing plans associated with moving the aircraft between maintenance stations;

accessing, using the functional module, data relating to available manpower at each maintenance station; and generating workload assignments for each maintenance station based on the routing plans, the data relating to available manpower, and plurality of validated requests for completion of maintenance items; and wherein the workload assignments for each maintenance station include:

routine maintenance items, wherein each routine maintenance item is an existing maintenance item having a recurrent repair interval associated with an interval of time in which the maintenance item should be completed; and open non-routine maintenance items, wherein each open non-routine maintenance item is an existing maintenance item having a flight allowance associated with an amount of time in which the maintenance item should be completed and wherein each open non-routine maintenance item is not associated with a recurrent repair interval.

5. The method of claim 4, wherein the plurality of validated requests for completion of maintenance items are requests for open non-routine maintenance items;

wherein the method further comprises the functional module referencing historical validated requests for completion of maintenance items and applying a probability distribution to forecast forecasted future non-routine maintenance items;

wherein the forecasted future non-routine maintenance items are predicted maintenance items not associated with a recurrent repair interval and wherein each forecasted future non-routine maintenance item is not an existing maintenance item; and wherein generating the workload assignments for each maintenance station is further based on the forecasted future non-routine maintenance items.

6. A method comprising:

storing information relevant to an aircraft maintenance system in a plurality of network-based non-transitory storage devices having data stored thereon regarding:

routing plans associated with moving aircraft between maintenance stations; and workload assignments for each maintenance station, wherein each workload assignment includes aircraft maintenance items to be completed at the maintenance stations;

providing remote access to users, using a functional module, over a network so any one of the users can input a request for an aircraft maintenance item for an aircraft using a graphical user interface;
validating, using the functional module, that the request for the aircraft maintenance item does not contain fundamental errors;
automatically generating, using the functional module, a message on the graphical user interface when the request does contain fundamental errors;
updating the workload assignments, using the functional module, based on the routing plans and the requests for aircraft maintenance items that do not contain fundamental errors;
wherein updating the workload assignment using the functional module comprises the functional module:
    accessing, via the network, the data regarding the routing plans from a first source; and
    accessing, via the network, the data regarding the workload assignments from a second source that is different from the first source;
receiving, by the functional module, the request for the aircraft maintenance item, which comprises:
    presenting a first window on the graphical user interface, the first window being associated with a selected aircraft that is part of an aircraft fleet, the first window including therewithin:
        a first selection box by which location data is indicated;
        a second selection box, a selection of which indicates that the first non-routine maintenance item is a fuel related item;
        a third selection box, a selection of which indicates that the first non-routine maintenance item is associated with an overwater restriction;
        a fourth selection box, a selection of which indicates that the first non-routine maintenance item is associated with a wide body domestic restriction;
        a fifth selection box, a selection of which indicates either another restriction with which the first non-routine maintenance item is associated, or that the first non-routine maintenance item is another type of item;
        a sixth selection box, a selection of which indicates that no indications are required with respect to the first non-routine maintenance item;
        a first drop-down menu, a selection from which indicates a time period by which a first non-routine maintenance item must be completed;
        a first text box by which an estimated quantity of general manhours, which are required for the performance of the first non-routine maintenance item, are indicated;
        a second text box by which an estimated quantity of avionics manhours, which are required for the performance of the first non-routine maintenance item, are indicated;
        a third text box by which an estimated amount of time that the selected aircraft is required to be on the ground for the first non-routine maintenance item to be performed excluding at least passenger loading/unloading and parking;
        a first plurality of text boxes by which a time period, during which the first non-routine maintenance item is not to be assigned, is indicated; and
        a first button, the selection of which commands the functional module to validate a first record of the first non-routine maintenance item;
    receiving, using the graphical user interface and by the functional module, the selection of the first selection box indicating the location of the selected aircraft;
    receiving, using the graphical user interface and by the functional module, one or more of the following:
        the selection of the second selection box indicating that the first non-routine maintenance item is a fuel related item;
        the selection of the third selection box indicating that the first non-routine maintenance item is associated with an overwater restriction;
        the selection of the fourth selection box indicating that the first non-routine maintenance item is associated with a wide body domestic restriction;
        the selection of the fifth selection box indicating either the another restriction with which the first non-routine maintenance item is associated, or that the first non-routine maintenance item is the another type of item; and
        the selection of the sixth selection box indicating that no indications are required with respect to the first non-routine maintenance item;
    receiving, using the graphical user interface and by the functional module, the selection from the first drop-down menu indicating the time period by which the first non-routine maintenance item must be completed; and
    receiving, using the graphical user interface and by the functional module, one or more of the following:
        via the first text box, the estimated quantity of general manhours required for the performance of the first non-routine maintenance item;
        via the second text box, the estimated quantity of avionics manhours required for the performance of the first non-routine maintenance item; and
        via the third text box, the estimated amount of time that the selected aircraft is required to be on the ground for the first non-routine maintenance item to be performed excluding at least passenger loading/unloading and parking.

7. The method of claim 6,
wherein the first record of the first non-routine maintenance item is a request for the aircraft maintenance item; and
wherein validating, using the functional module, that the request for the aircraft maintenance item does not contain fundamental errors comprises:
    validating, using the functional module, the first record of the first non-routine maintenance item, comprising:
        receiving, using the graphical user interface and by the functional module, the selection of the first button commanding the functional module to validate the first record of the first non-routine maintenance item;
        confirming, using the functional module, the receipt of one or more of the respective selections of the second, third, fourth, fifth, and sixth selection boxes; and
        confirming, using functional module, the receipt of one or more of the estimated quantity of general manhours required for the performance of the first non-routine maintenance item, the estimated quantity of avionics manhours required for the performance of the first non-routine maintenance item, and the estimated amount of time that the selected aircraft is required to be on the ground for the first non-routine maintenance item to be performed excluding at least passenger loading/unloading and parking;

after validating the first record of the first non-routine maintenance item, saving, using the functional module, the validated first record of the first non-routine maintenance item as a request for aircraft maintenance items that does not contain fundamental errors.

* * * * *